(12) United States Patent
Johnston et al.

(10) Patent No.: US 12,121,983 B1
(45) Date of Patent: Oct. 22, 2024

(54) TUBE DEBURRING APPARATUS AND METHODS OF USE

(71) Applicants: Ronald Kevin Johnston, El Cajon, CA (US); Charles Benjamin Harris, El Cajon, CA (US)

(72) Inventors: Ronald Kevin Johnston, El Cajon, CA (US); Charles Benjamin Harris, El Cajon, CA (US)

( * ) Notice: Subject to any disclaimer, the term of this patent is extended or adjusted under 35 U.S.C. 154(b) by 0 days.

(21) Appl. No.: 18/538,362

(22) Filed: Dec. 13, 2023

(51) Int. Cl.
*B23B 5/16* (2006.01)

(52) U.S. Cl.
CPC ...... *B23B 5/168* (2013.01); *B23B 2200/0471* (2013.01); *B23B 2200/28* (2013.01)

(58) Field of Classification Search
CPC ......... B23B 5/168; B23B 5/167; B23B 5/163; B23B 5/162; B23B 5/161; B23B 5/16; Y10T 408/893; Y10T 409/50246; Y10T 409/304144
See application file for complete search history.

(56) References Cited

U.S. PATENT DOCUMENTS

| | | | | |
|---|---|---|---|---|
| 2,188,584 A * | 1/1940 | Tyne | ...................... | B23B 5/167 408/233 |
| 2,820,387 A * | 1/1958 | Smerz | ..................... | B23B 5/168 29/561 |
| 3,115,054 A * | 12/1963 | Rupe | ......................... | B23B 5/16 82/173 |
| 3,122,818 A | 3/1964 | Nance | | |
| 3,515,029 A * | 6/1970 | Gambini | ................... | B23B 5/16 407/7 |
| 3,776,467 A | 12/1973 | Riemerschmid | | |
| 4,118,140 A * | 10/1978 | Hamilton | ................ | B23B 5/167 408/59 |
| 4,180,358 A * | 12/1979 | Uribe | ...................... | B23B 5/168 82/113 |
| 4,207,786 A * | 6/1980 | Astle | ....................... | B23B 5/168 82/113 |

(Continued)

FOREIGN PATENT DOCUMENTS

BR 202016012478 U2 * 12/2017 ............... B23B 5/16
CH 265931 A * 12/1949

(Continued)

*Primary Examiner* — Ryan Rufo
(74) *Attorney, Agent, or Firm* — Trestle Law, APC; Justin G. Sanders

(57) ABSTRACT

A tube deburring apparatus is disclosed and configured for deburring and beveling a terminal end of a tube. In at least one embodiment, the apparatus provides a deburring mechanism configured for use with a torque mechanism. The deburring mechanism provides a plurality of spaced apart bearings radially arranged about a center axis of rotation of a deburring body of the deburring mechanism and defining an imaginary receiving boundary sized for coaxially receiving the terminal end of the tube therewithin. The deburring body further provides a deburring bit positioned radially inwardly from the bearings, a deburring end of the deburring bit providing a cutting edge configured for selectively contacting the terminal end of the tube when the terminal end of the tube is coaxially positioned within the receiving boundary between the bearings.

20 Claims, 11 Drawing Sheets

(56) References Cited

U.S. PATENT DOCUMENTS

| | | | | |
|---|---|---|---|---|
| 4,798,109 | A | * | 1/1989 | Berns ................ B23B 5/163 82/119 |
| 5,076,122 | A | * | 12/1991 | Katzenburger ........ B23B 5/163 407/113 |
| 5,393,176 | A | * | 2/1995 | Waring ............... B23B 5/163 408/105 |
| 5,497,539 | A | * | 3/1996 | Blodgett ............. B23B 5/168 408/112 |
| 7,029,211 | B2 | * | 4/2006 | Oswald .............. B26D 3/166 408/211 |
| 7,685,718 | B2 | * | 3/2010 | Ames ................. B23D 79/08 30/314 |
| 7,712,404 | B1 | * | 5/2010 | Markle ............... B23B 5/167 407/39 |
| 11,007,559 | B2 | * | 5/2021 | Johnston ............. B24B 23/02 |
| 11,052,564 | B2 | | 7/2021 | Fellmann et al. |
| 11,607,772 | B2 | | 3/2023 | Luescher et al. |
| 2012/0067190 | A1 | * | 3/2012 | Tseng ................. B23C 3/122 83/869 |
| 2017/0197457 | A1 | * | 7/2017 | Garr .................. B41F 17/30 |
| 2023/0150038 | A1 | | 5/2023 | Laporte |

FOREIGN PATENT DOCUMENTS

| | | | | |
|---|---|---|---|---|
| CN | 105364091 | A | * | 3/2016 |
| CN | 112453438 | A | * | 3/2021 |
| DE | 1552421 | B1 | * | 11/1969 |
| DE | 20216663 | U1 | * | 12/2002 ............ B23B 5/167 |
| DE | 10140925 | A1 | * | 3/2003 ............ B23B 5/168 |
| EP | 1361007 | A2 | * | 11/2003 ............ B21H 7/182 |
| EP | 2644301 | A1 | * | 10/2013 ....... B23B 29/03435 |
| JP | 58217201 | A | * | 12/1983 |
| KR | 20030051327 | A | * | 6/2003 |
| KR | 20120110449 | A | * | 10/2012 |
| WO | WO-2012101319 | A1 | * | 8/2012 ............ B23B 5/168 |
| WO | 2023099084 | A1 | | 6/2023 |
| WO | 2023143785 | A1 | | 8/2023 |

* cited by examiner

TUBE DEBURRING APPARATUS AND METHODS OF USE

RELATED APPLICATIONS

Not applicable.

BACKGROUND

The subject of this patent application relates generally to tools, and more particularly to a tube deburring apparatus and associated methods of use for deburring and beveling a terminal end of a tube.

Applicant(s) hereby incorporate herein by reference any and all patents and published patent applications cited or referred to in this application.

By way of background, the process of modifying a tube or pipe (hereinafter referred to collectively as a "tube" for simplicity purposes)—such as by cutting the tube, for example—can often result in one or more burrs (i.e., a raised, sharp and/or non-uniform edge—hereinafter collectively referred to as a "burr" for simplicity purposes) being formed on a terminal end of the tube, which can hinder the attachment of couplings to the tube, in addition to creating other potential issues. There are many types of existing processes and machines for deburring a tube; however, those existing processes and machines tend to be either time and/or labor intensive (particularly, the processes involving manually operated tools) or require relatively expensive and/or complex machines. Accordingly, there remains a need for a deburring tool that is relatively fast, easy to use, and inexpensive.

Aspects of the present invention fulfill these needs and provide further related advantages as described in the following summary.

It should be noted that the above background description includes information that may be useful in understanding aspects of the present invention. It is not an admission that any of the information provided herein is prior art or relevant to the presently claimed invention, or that any publication specifically or implicitly referenced is prior art.

SUMMARY

Aspects of the present invention teach certain benefits in construction and use which give rise to the exemplary advantages described below.

The present invention solves the problems described above by providing a tube deburring apparatus and associated methods of use for deburring and beveling a terminal end of a tube. In at least one embodiment, the apparatus provides a deburring mechanism configured for use with a torque mechanism capable of selectively delivering a desired amount of torque to the deburring mechanism. The deburring mechanism provides a deburring body having a first face and an opposing second face. A plurality of bearings are positioned substantially on the first face of the deburring body and radially arranged about a center axis of rotation of the deburring body, the bearings radially spaced apart from one another and cooperating to define an imaginary receiving boundary having a receiving diameter that is sized for approximating an outer diameter of the tube, thereby allowing the terminal end of the tube to be coaxially positioned within the receiving boundary, such that a circumferential bearing sidewall of each bearing is in rolling contact with a circumferential outer surface of the tube. The first face of the deburring body defines a radially oriented bearing slot for each of the bearings, each bearing slot providing a bearing carrier slidably positioned therewithin. Each bearing is rotatably mounted to the corresponding one of the bearing carriers, such that each bearing is capable of selectively moving inwardly and outwardly relative to the center axis via the corresponding bearing carrier, thereby allowing the receiving diameter of the receiving boundary to be selectively adjusted. A deburring bit is positioned substantially on the first face of the deburring body in a position radially inwardly from the bearings and oriented substantially perpendicular to the first face of the deburring body, a deburring end of the deburring bit configured for selectively contacting the terminal end of the tube when the terminal end of the tube is coaxially positioned within the receiving boundary between the bearings. The first face of the deburring body defines a radially oriented bit slot configured for slidably receiving an opposing engagement end of the deburring bit therewithin, such that the deburring bit is capable of selectively moving inwardly and outwardly relative to the center axis. The deburring end of the deburring bit provides a cutting edge positioned proximal to an inner edge of the deburring bit, the cutting edge comprising an inner cutting portion, a beveling portion, and an outer cutting portion. The inner cutting portion is positioned adjacent to the inner edge of the deburring bit and configured for contacting an inner surface of the tube, proximal to the terminal end of the tube, and removing any burrs therefrom when the terminal end of the tube is coaxially positioned within the receiving boundary between the bearings. The beveling portion is positioned adjacent to the inner cutting portion and configured for contacting the terminal end of the tube and removing any burrs therefrom, while also beveling the terminal end of the tube, when the terminal end of the tube is coaxially positioned within the receiving boundary between the bearings. The outer cutting portion is positioned adjacent to the beveling portion and configured for contacting the outer surface of the tube, proximal to the terminal end of the tube, and removing any burrs therefrom when the terminal end of the tube is coaxially positioned within the receiving boundary between the bearings. The outer cutting portion sits substantially on the receiving boundary formed by the bearings, while the beveling portion is positioned so as to sit radially inwardly from and substantially adjacent to the receiving boundary. The deburring mechanism further provides an engagement portion positioned on the second face of the deburring body and configured for being removably engaged with the torque mechanism.

In at least one embodiment, the apparatus further provides a toque mechanism. In at least one such embodiment, the torque mechanism comprises a housing that provides an at least one longitudinally oriented guide rail. A tube clamp is positioned within the housing and configured for temporary frictional engagement with the outer surface of the tube, proximal to the terminal end of the tube, for securely maintaining a position of the terminal end of the tube relative to the deburring mechanism. A torque carrier is slidably positioned on the at least one guide rail. A bushing assembly is positioned on the torque carrier and configured for engagement with the engagement portion of the deburring mechanism, such that the deburring mechanism is capable of selectively moving along the at least one guide rail between one of an extended position—wherein the deburring mechanism is moved into contact with the terminal end of the tube, while the tube is frictionally engaged within the tube clamp, such that the terminal end of the tube is coaxially positioned within the receiving boundary between the bearings and the cutting edge of the deburring bit is in contact with the terminal end of the tube—and a retracted position—wherein the deburring mechanism is moved out of contact with the terminal end of the tube. A rotary motor is positioned on the torque carrier and in mechanical communication with the bushing assembly for selectively delivering the desired amount of torque to the bushing assembly and, in turn, the deburring mechanism. An actuation lever is pivotally engaged with the housing and in mechanical communication with each of the motor and torque carrier, the actuation lever configured for being selectively rotated between one of a maximum position—wherein the actuation lever is rotated in a first rotational direction, causing the speed of the motor to progressively increase and moving the deburring mechanism into the extended position—and a rest position—wherein the actuation lever is rotated in an opposing second rotational direction, causing the speed of the motor to progressively decrease and moving the deburring mechanism into the retracted position.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Figure 1:
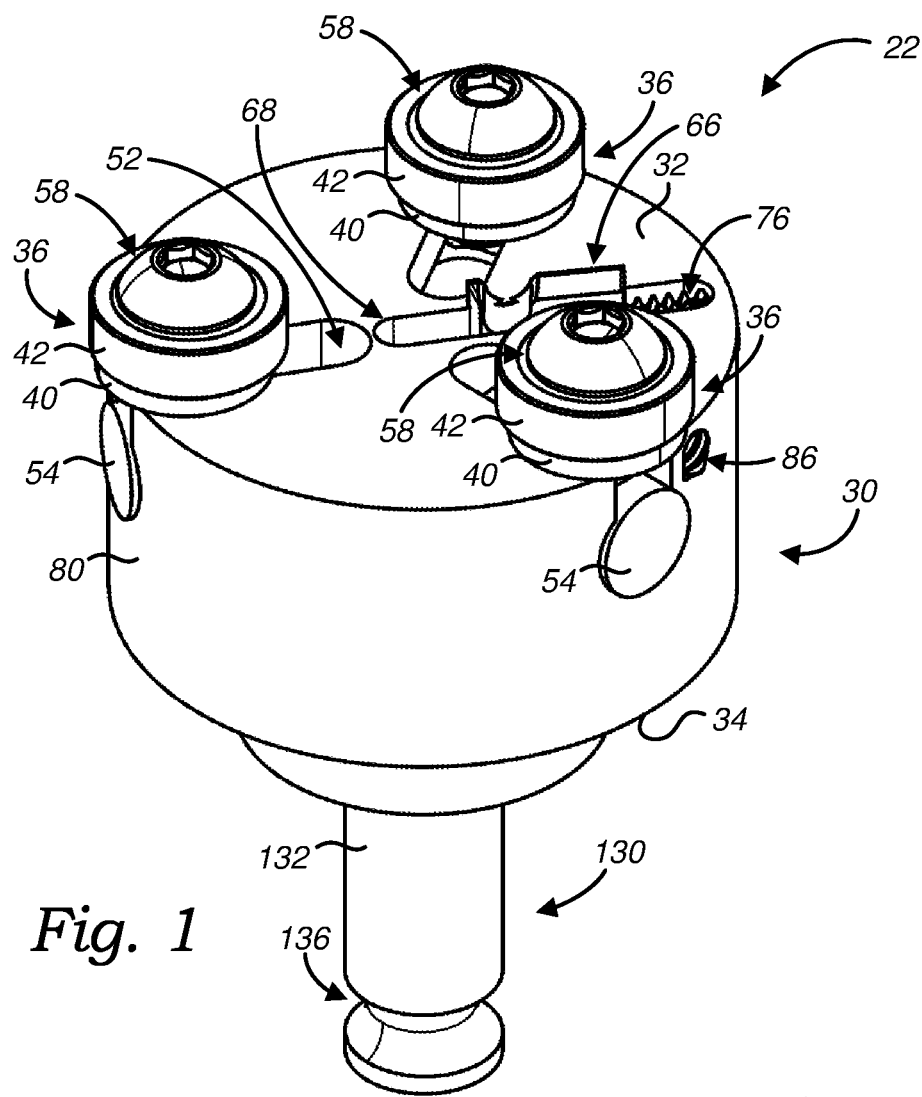
FIG. 1 is a perspective view of a deburring mechanism of an exemplary tube deburring apparatus, in accordance with at least one embodiment.

Turning now to FIG. 1, there is shown a perspective view of a deburring mechanism 22 of an exemplary tube 26 deburring apparatus 20 configured for deburring and beveling a terminal end 24 of a tube 26 when used in conjunction with a torque mechanism 28 of the apparatus 20. In that regard, as noted above, the term "tube" is intended to include any type of tubular structure—now known or later developed—that might require a deburred and/or beveled terminal end 24, such as a pipe for example. Accordingly, any tubes 26 depicted in the accompanying drawings or described herein are merely exemplary. In at least one embodiment, a deburring body 30 of the deburring mechanism 22 provides a first face 32 and an opposing second face 34. Additionally, in at least one embodiment, the deburring body 30 has a substantially cylindrical shape; however, in further embodiments, the deburring body 30 may take on any other sizes, shapes, dimensions and/or configurations, now known or later developed, so long as the apparatus 20 is capable of substantially carrying out the functionality described herein.

Figure 2:
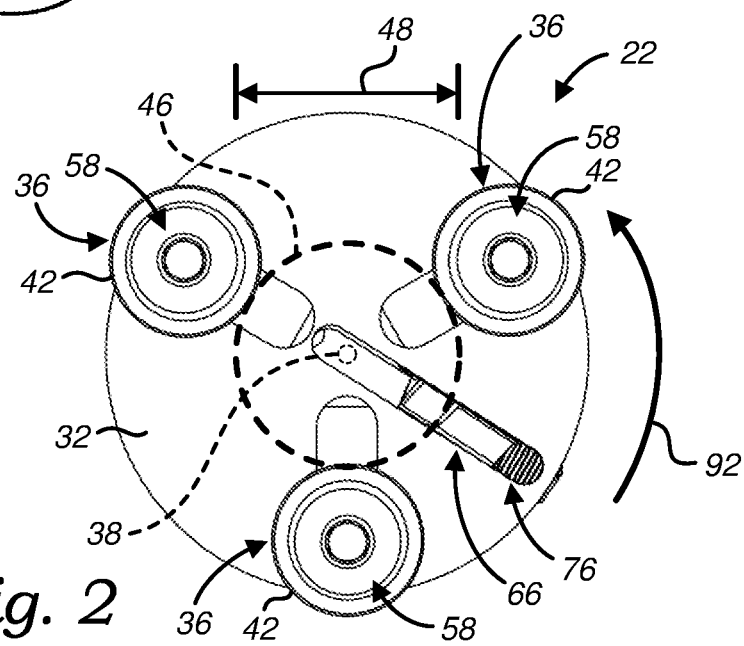
FIG. 2 is a top plan view thereof, in accordance with at least one embodiment.
Figure 3:
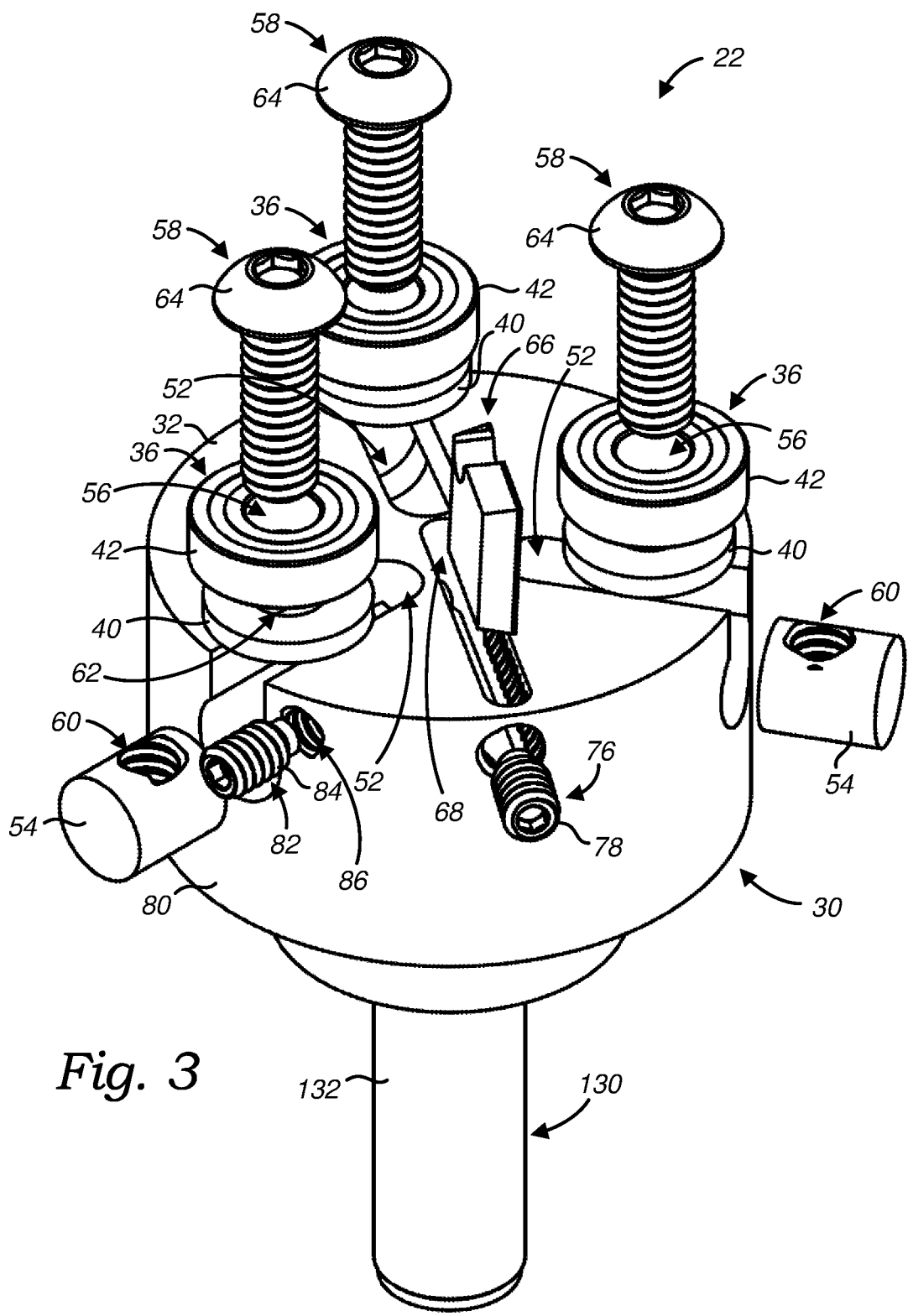
FIG. 3 is an exploded perspective view thereof, in accordance with at least one embodiment.

In at least one embodiment, as best illustrated in FIGS. 1-3, the deburring mechanism 22 provides a plurality of radially spaced apart bearings 36 positioned substantially on the first face 32 of the deburring body 30 and radially arranged about a center axis 38 of rotation of the deburring body 30 (FIG. 2), as defined by a longitudinal axis of the deburring mechanism 22. In that regard, it should be noted that all references to radial, axial, and circumferential directions and measurements refer to the center axis 38, unless specified otherwise, and terms such as "inwardly" and "outwardly" generally indicate a lesser or greater radial distance from the center axis 38, wherein a radial may be in any direction perpendicular and radiating outward from the center axis 38. In at least one embodiment, the deburring mechanism 22 further provides an at least one spacer 40 positioned between each bearing 36 and the first face 32 of the deburring body 30, thereby preventing the first face 32 of the deburring body 30 from obstructing or hindering rotation of the bearing 36.

Figure 8:
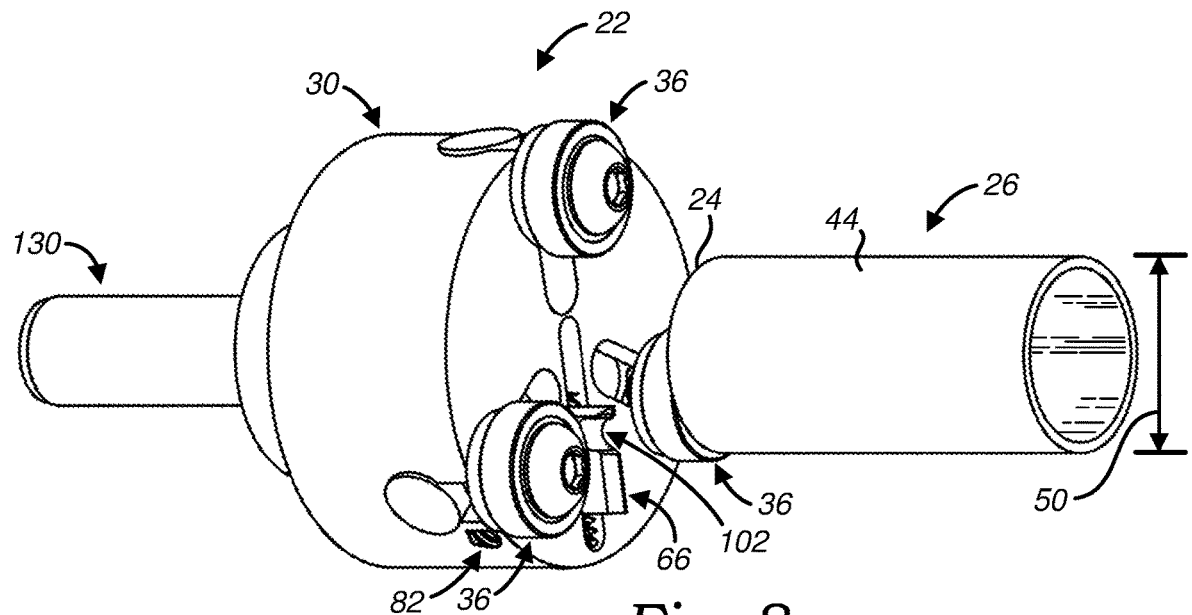
FIGS. 8 and 9 are further perspective views thereof, illustrating use of the deburring mechanism on an exemplary tube, in accordance with at least one embodiment.
Figure 9:
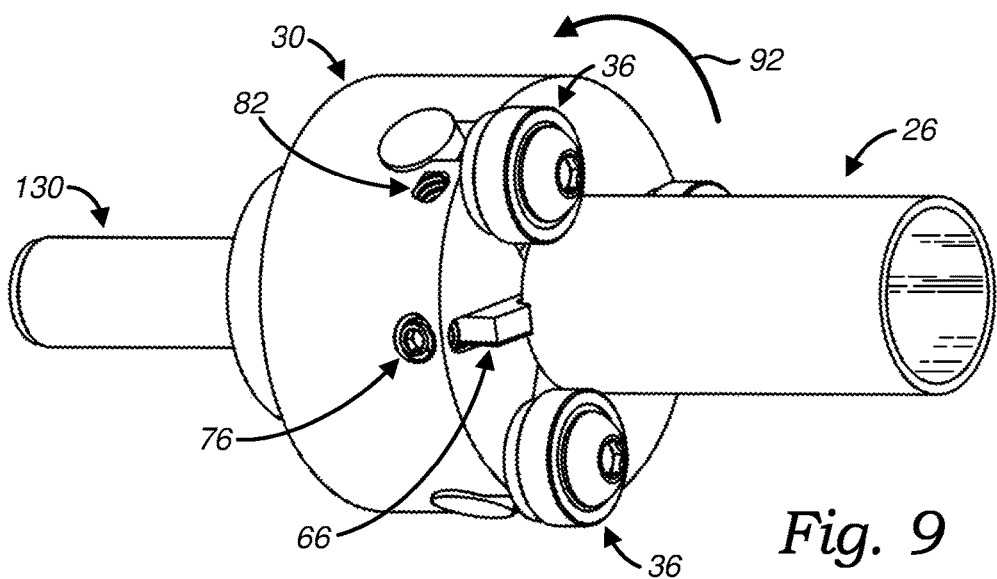
Figure 10:
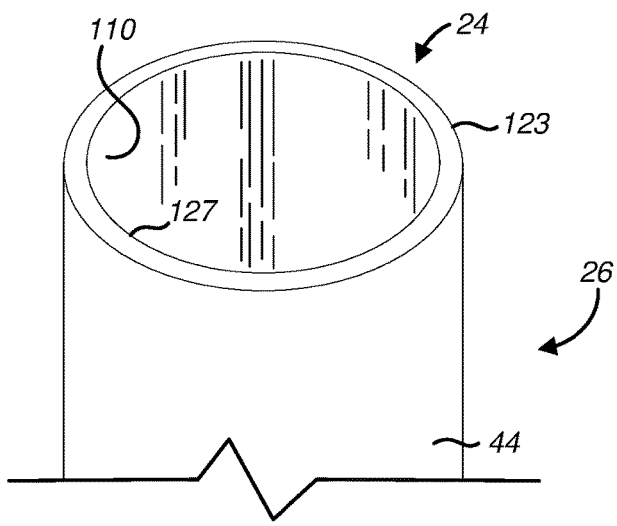
FIG. 10 is a partial perspective view of a terminal end of an exemplary tube prior to being deburred by the apparatus, in accordance with at least one embodiment.
Figure 11:
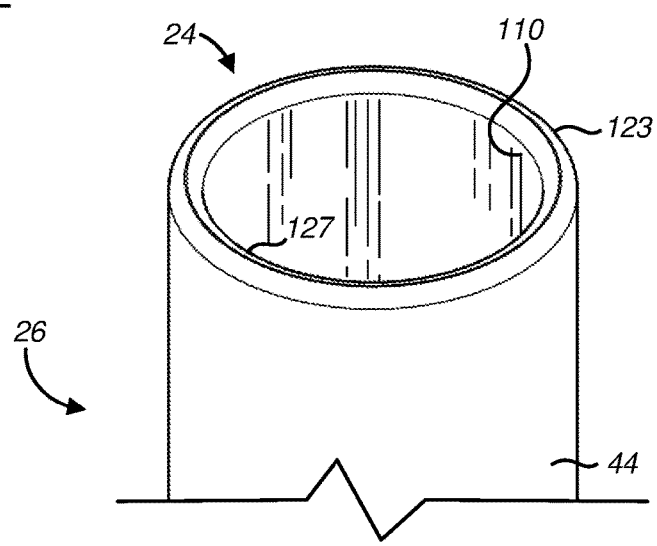
FIG. 11 is a further partial perspective view of a terminal end of an exemplary tube after being deburred by the apparatus, in accordance with at least one embodiment.

In at least one embodiment, the bearings 36 are radially spaced apart from one another so as to receive a tube 26 therebetween during use of the apparatus 20, such that a circumferential bearing sidewall 42 of each bearing 36 is in rolling contact with a circumferential outer surface 44 of the tube 26, as illustrated in FIG. 9. Accordingly, the bearings 36 cooperate to define an imaginary receiving boundary 46 having a receiving diameter 48 (FIG. 2) that is sized for approximating an outer diameter 50 (FIG. 8) of the tube 26. In at least one embodiment, the first face 32 of the deburring body 30 defines a radially oriented bearing slot 52 for each of the bearings 36. Additionally, each bearing slot 52 provides a bearing carrier 54 slidably positioned therewithin, such that each bearing carrier 54 is capable of selectively sliding inwardly and outwardly relative to the center axis 38. In at least one embodiment, each bearing 36 provides a bearing aperture 56 sized and configured for allowing a bearing fastener 58 to coaxially extend therethrough, in a direction substantially perpendicular to the first face 32 of the deburring body 30, while the corresponding bearing carrier 54 provides a carrier aperture 60 sized and configured for threadably receiving the bearing fastener 58 therethrough, thereby interconnecting the bearing 36 and corresponding bearing carrier 54. Additionally, in embodiments where the deburring mechanism 22 provides an at least one spacer 40 as discussed above, each spacer 40 provides a spacer aperture 62 sized and configured for allowing the bearing fastener 58 to coaxially extend therethrough as well. In at least one embodiment, a fastener head 64 of each bearing fastener 58 is configured for being selectively tightened against the corresponding bearing 36, thereby sandwiching the bearing 36 between the fastener head 64 and the first face 32 of the deburring body 30 (or between the fastener head 64 and the corresponding spacer 40) which, in turn, frictionally maintains the corresponding bearing carrier 54 in position within the bearing slot 52. Accordingly, each bearing 36 is capable of being selectively moved inwardly and outwardly relative to the center axis 38, thereby allowing the receiving diameter 48 to be selectively adjusted in order to accommodate a wide range of tubes 26 having varying outer diameters 50. In at least one embodiment, the deburring mechanism 22 provides three radially spaced apart bearings 36; however, in further embodiments, the deburring mechanism 22 provides less than three bearings 36 or more than three bearings 36.

In at least one embodiment, the deburring mechanism 22 further provides a deburring bit 66 positioned substantially on the first face 32 of the deburring body 30 in a position radially inwardly from the bearings 36 and oriented substantially perpendicular to the first face 32 of the deburring body 30. In at least one embodiment, the deburring bit 66 is constructed out of a carbide material; however, in further embodiments, the deburring bit 66 may be constructed out of any other materials (or combinations of materials), now known or later developed—dependent at least in part on the context in which the deburring mechanism 22 is to be used and/or the material(s) of the tube 26 to be deburred and beveled by the deburring mechanism 22—so long as the apparatus 20 is capable of substantially carrying out the functionality described herein. In at least one embodiment, the first face 32 of the deburring body 30 defines a radially oriented bit slot 68. An engagement end 70 of the deburring bit 66 is slidably positioned within the bit slot 68, while an opposing deburring end 72 of the deburring bit 66 is configured for selectively contacting the terminal end 24 of the tube 26 during use of the apparatus 20, as discussed further below. Accordingly, in at least one embodiment, the deburring bit 66 is capable of selectively moving inwardly and outwardly, within the bit slot 68, relative to the center axis 38, thereby allowing the deburring bit 66 to be selectively adjusted in order to accommodate a wide range of tubes 26 having varying outer diameters 50. Additionally, in at least one embodiment, the deburring end 72 of the deburring bit 66 is configured for being removably engaged with the bit slot 68, thereby allowing deburring bits 66 of varying sizes, shapes, dimensions and/or configurations to be selectively engaged with the bit slot 68, depending on the dimensions of the tube 26 to be deburred and beveled by the apparatus 20.

In at least one embodiment, an outwardly oriented outer edge 74 of the deburring bit 66 is engaged with a bit adjuster 76 positioned and configured for selectively moving the deburring bit 66 inwardly and outwardly relative to the center axis 38 via the bit slot 68. In at least one such embodiment, the bit adjuster 76 is a set screw 78 threadably engaged with the bit slot 68 and accessible through a sidewall 80 of the deburring body 30, whereby rotating the set screw 78 in a first direction causes the deburring bit 66 to move inwardly within the bit slot 68, and rotating the set screw 78 in an opposing second direction causes the deburring bit 66 to move outwardly within the bit slot 68. In further embodiments, the bit adjuster 76 may comprise any other mechanism, now known or later developed, capable of selectively moving the deburring bit 66 inwardly and outwardly relative to the center axis 38 via the bit slot 68. Additionally, in at least one embodiment, the deburring mechanism 22 provides a bit lock 82 positioned and configured for selectively preventing the deburring bit 66 from moving inwardly and outwardly relative to the center axis 38 via the bit slot 68. In at least one such embodiment, the bit lock 82 is also a set screw 84 threadably engaged with a locking slot 86 that converges with the bit slot 68, thereby allowing the set screw 84 to come into frictional abutting contact with the deburring bit 66 so as to physically prevent the deburring bit 66 from moving within the bit slot 68. In further embodiments, the bit lock 82 may comprise any other mechanism, now known or later developed, capable of selectively preventing the deburring bit 66 from moving inwardly and outwardly relative to the center axis 38 via the bit slot 68.

In at least one embodiment as best illustrated in FIGS. 4-7, the deburring bit 66 provides an outwardly oriented outer edge 74 and an opposing inwardly oriented inner edge 88, with each of the engagement end 70 and opposing deburring end 72 extending therebetween. The deburring bit 66 further provides a leading face 90 positioned for facing a direction of rotation 92 (FIG. 2) of the deburring mechanism 22 during use of the apparatus 20, and an opposing trailing face 94 positioned for facing away from the direction of rotation 92 of the deburring mechanism 22 during use of the apparatus 20. In at least one embodiment, the deburring bit 66 has a bit height 96 (FIG. 4) of about 0.30 inches to about 0.50 inches. However, in further embodiments, the deburring bit 66 may have a bit height 96 of less than 0.30 inches or greater than 0.50 inches—dependent at least in part on the dimensions of the tube 26 to be deburred and beveled by the apparatus 20. In at least one embodiment, the deburring bit 66 has a bit width 98 (FIG. 4) of about 0.30 inches to about 0.50 inches. However, in further embodiments, the deburring bit 66 may have a bit width 98 of less than 0.30 inches or greater than 0.50 inches—dependent at least in part on the dimensions of the tube 26 to be deburred and beveled by the apparatus 20. In at least one embodiment, the deburring bit 66 has a bit thickness 100 (FIG. 5) of about 0.1 inches to about 0.2 inches. However, in further embodiments, the deburring bit 66 may have a bit thickness 100 of less than 0.1 inches or greater than 0.2 inches—dependent at least in part on the dimensions of the tube 26 to be deburred and beveled by the apparatus 20. For ease of reference, unless specified otherwise, the terms "upwardly" and "upper" as used in connection with describing the various components of the deburring bit 66 are intended to mean proximal to or toward the deburring end 72 of the deburring bit 66, while the terms "downwardly" and "lower" are intended to mean proximal to or toward the engagement end 70 of the deburring bit 66—regardless of the specific orientation of the deburring bit 66.

In at least one embodiment, the deburring end 72 of the deburring bit 66 provides a cutting edge 102 positioned proximal to the inner edge 88 of the deburring bit 66. In at least one embodiment, the cutting edge 102 comprises an inner cutting portion 104 positioned adjacent to the inner edge 88 of the deburring bit 66, a beveling portion 106 positioned adjacent to the inner cutting portion 104, and an outer cutting portion 108 positioned adjacent to the beveling portion 106.

Figure 6:
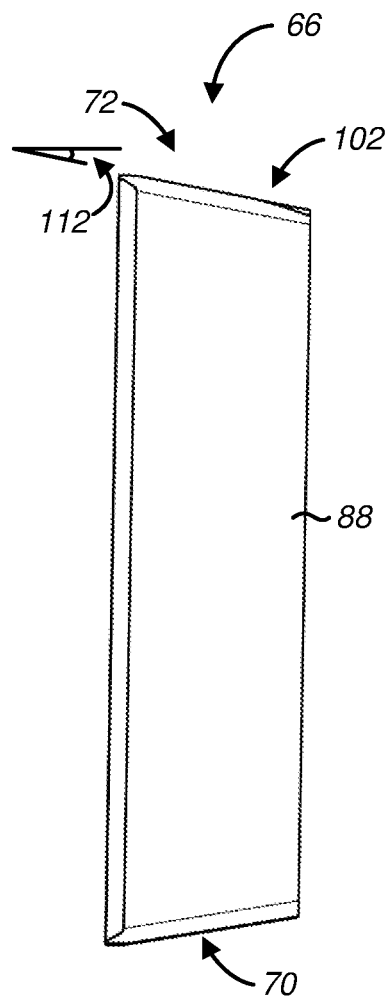
FIG. 6 is a right side elevational view thereof, in accordance with at least one embodiment.

In at least one embodiment, the inner cutting portion 104 is configured for contacting an inner surface 110 of the tube 26, proximal to the terminal end 24 of the tube 26, when the terminal end 24 of the tube 26 is coaxially positioned within the receiving boundary 46 between the bearings 36. Accordingly, the inner cutting portion 104 is capable of removing any burrs from the inner surface 110 of the tube 26, proximal to the terminal end 24 of the tube 26, during use of the apparatus 20. In at least one embodiment, the inner cutting portion 104 is oriented so as to have a downwardly sloping inner cutting angle 112 from the leading face 90 of the deburring bit 66 to the trailing face 94 of the deburring bit 66. In at least one such embodiment, as illustrated in FIG. 6, the inner cutting portion 104 has an inner cutting angle 112 of about 10 degrees to about 30 degrees relative to the leading face 90 of the deburring bit 66. However, in further embodiments, the inner cutting portion 104 may have an inner cutting angle 112 of less than 10 degrees or greater than 30 degrees relative to the leading face 90 of the deburring bit 66—dependent at least in part on the dimensions of the tube 26 to be deburred and beveled by the apparatus 20.

Figure 7:
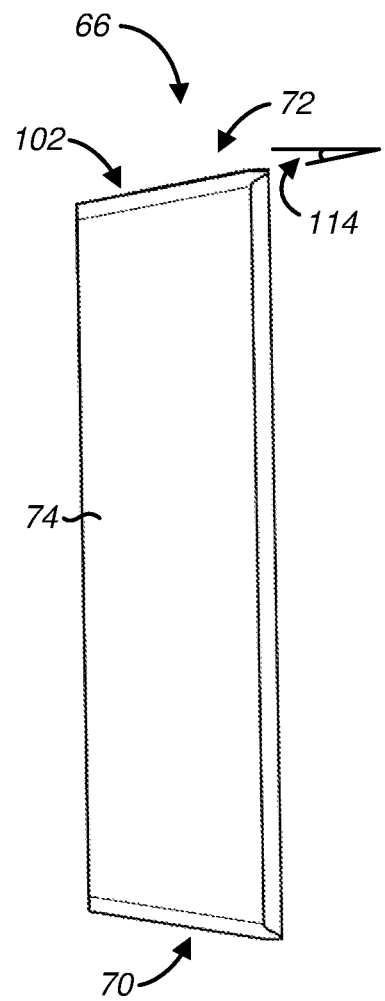
FIG. 7 is a left side elevational view thereof, in accordance with at least one embodiment.

In at least one embodiment, the outer cutting portion 108 is configured for contacting the outer surface 44 of the tube 26, proximal to the terminal end 24 of the tube 26, when the terminal end 24 of the tube 26 is coaxially positioned within the receiving boundary 46 between the bearings 36. Accordingly, the outer cutting portion 108 is capable of removing any burrs from the outer surface 44 of the tube 26, proximal to the terminal end 24 of the tube 26, during use of the apparatus 20. In at least one embodiment, the outer cutting portion 108 is oriented so as to have a downwardly sloping outer cutting angle 114 from the leading face 90 of the deburring bit 66 to the trailing face 94 of the deburring bit 66. In at least one such embodiment, as illustrated in FIG. 7, the outer cutting portion 108 has an outer cutting angle 114 of about 10 degrees to about 30 degrees relative to the leading face 90 of the deburring bit 66. However, in further embodiments, the outer cutting portion 108 may have an outer cutting angle 114 of less than 10 degrees or greater than 30 degrees relative to the leading face 90 of the deburring bit 66—dependent at least in part on the dimensions of the tube 26 to be deburred and beveled by the apparatus 20. In at least one embodiment, the inner cutting angle 112 is substantially equal to the outer cutting angle 114. In at least one alternate embodiment, the inner cutting angle 112 is less than the outer cutting angle 114. In at least one further alternate embodiment, the inner cutting angle 112 is greater than the outer cutting angle 114.

In at least one embodiment, the beveling portion 106 is configured for contacting the terminal end 24 of the tube 26 when the terminal end 24 of the tube 26 is coaxially positioned within the receiving boundary 46 between the bearings 36. Accordingly, the beveling portion 106 is capable of removing any burrs from the terminal end 24 of the tube 26, while also beveling the terminal end 24 of the tube 26, during use of the apparatus 20. As such, in at least one embodiment, as best illustrated in FIG. 2, the outer cutting portion 108 sits substantially on the receiving boundary 46 formed by the bearings 36, while the beveling portion 106 is positioned so as to sit radially inwardly from and substantially adjacent to the receiving boundary 46. In at least one embodiment, the beveling portion 106 is configured as a concave groove, having a substantially semicircular shape in cross-section, extending from the leading face 90 of the deburring bit 66 to the trailing face 94 of the deburring bit 66. In at least one such embodiment, the beveling portion 106 has a beveling diameter 116 of about 0.03 millimeters to about 3.1 millimeters. However, in further embodiments, the beveling portion 106 may have a beveling diameter 116 of less than 0.03 millimeters or greater than 3.1 millimeters—dependent at least in part on the dimensions of the tube 26 to be deburred and beveled by the apparatus 20. Additionally, in at least one embodiment, the beveling portion 106 has a beveling curvature 117 of about 100 degrees to about 180 degrees. However, in further embodiments, the beveling portion 106 may have a beveling curvature of less than 100 degrees or greater than 180 degrees—dependent at least in part on the dimensions of the tube 26 to be deburred and beveled by the apparatus 20.

Figure 4:
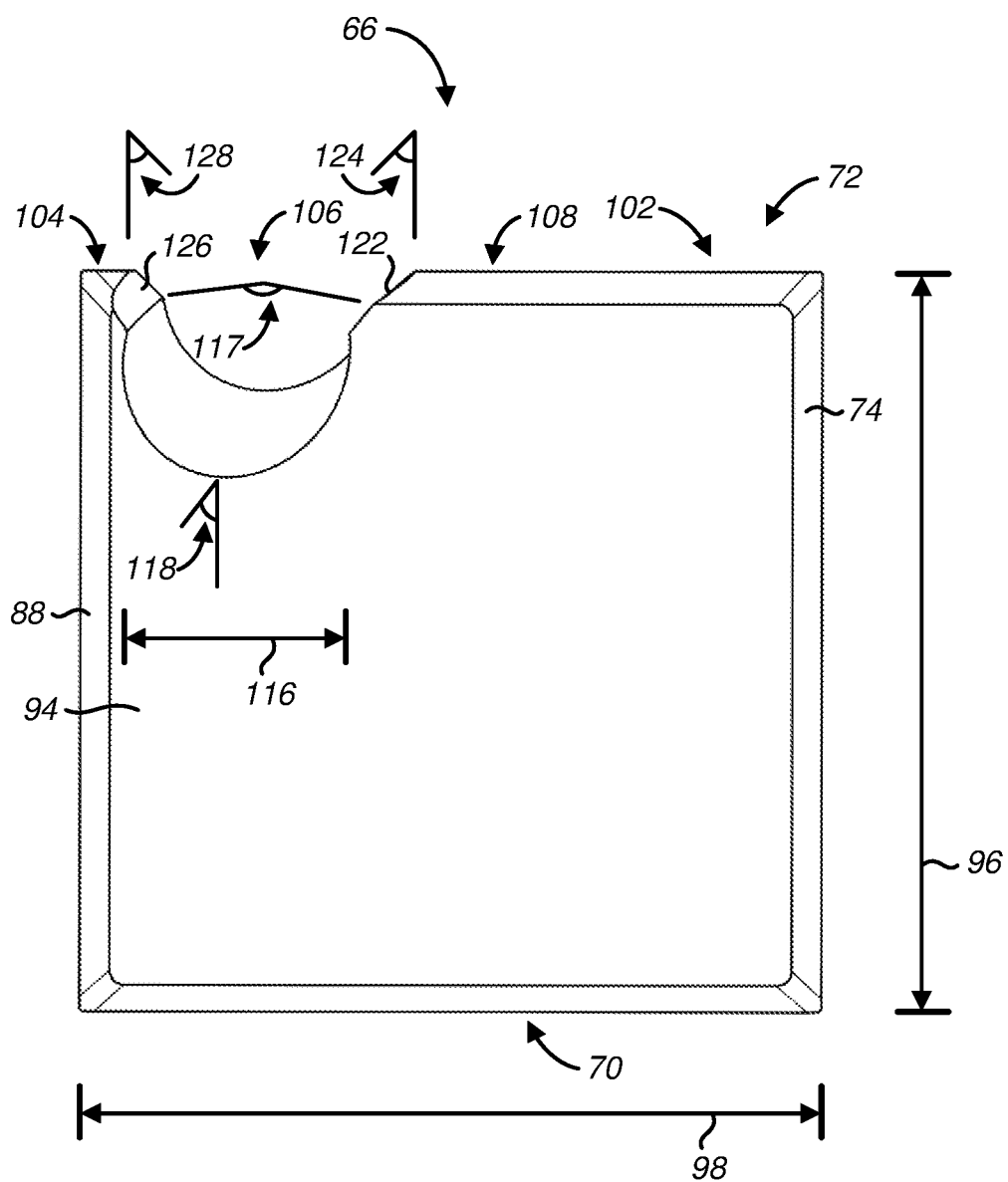
FIG. 4 is a rear elevational view of an exemplary deburring bit, in accordance with at least one embodiment.

In at least one embodiment, the beveling portion 106 is oriented so as to have a downwardly sloping first beveling angle 118 from the leading face 90 of the deburring bit 66 to the trailing face 94 of the deburring bit 66. In at least one such embodiment, as illustrated in FIG. 4, the beveling portion 106 has a first beveling angle 118 of about 20 degrees to about 30 degrees relative to the leading face 90 of the deburring bit 66. However, in further embodiments, the beveling portion 106 may have an first beveling angle 118 of less than 20 degrees or greater than 30 degrees relative to the leading face 90 of the deburring bit 66—dependent at least in part on the dimensions of the tube 26 to be deburred and beveled by the apparatus 20. In at least one embodiment, the first beveling angle 118 is substantially equal to one or both of the inner cutting angle 112 and outer cutting angle 114. In at least one alternate embodiment, the first beveling angle 118 is less than one or both of the inner cutting angle 112 and outer cutting angle 114. In at least one further alternate embodiment, the first beveling angle 118 is greater than one or both of the inner cutting angle 112 and outer cutting angle 114.

Figure 5:
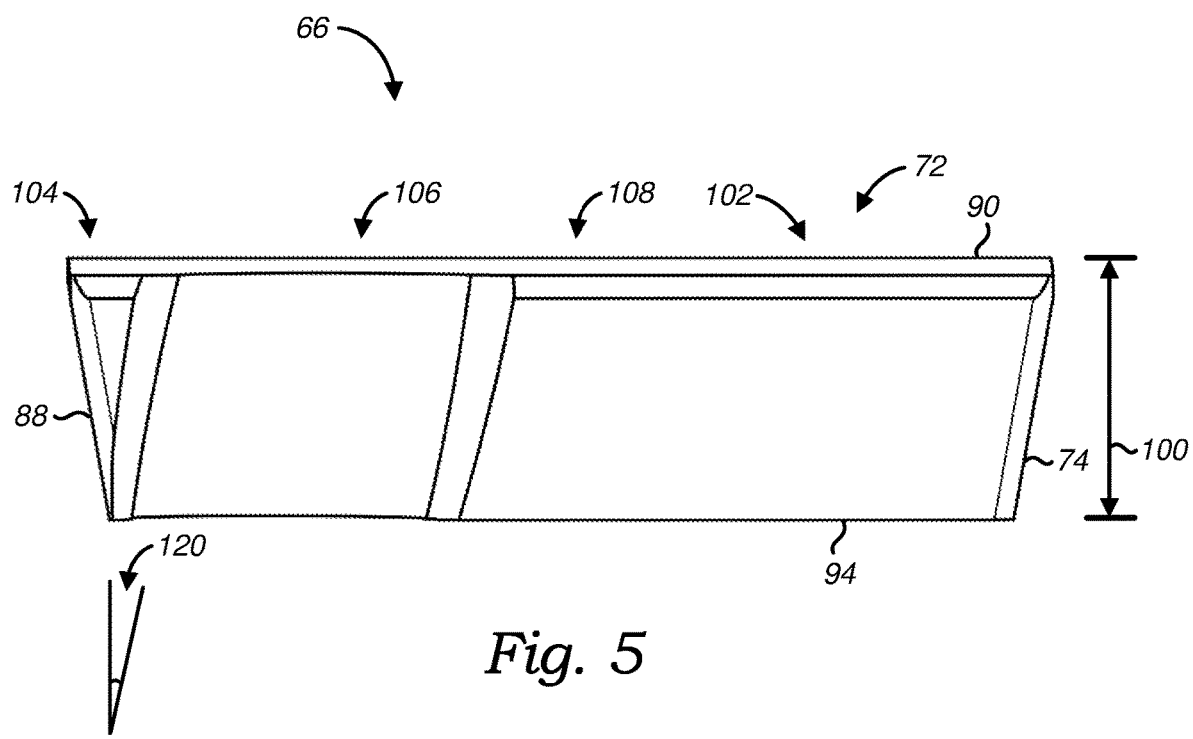
FIG. 5 is a top plan view thereof, in accordance with at least one embodiment.

In at least one embodiment, the beveling portion 106 is further oriented so as to have an outwardly oriented second beveling angle 120 from the leading face 90 of the deburring bit 66 to the trailing face 94 of the deburring bit 66, relative to the inner edge 88 of the deburring bit 66. In at least one such embodiment, as illustrated in FIG. 5, the beveling portion 106 has a second beveling angle 120 of about 20 degrees to about 30 degrees relative to the inner edge 88 of the deburring bit 66. However, in further embodiments, the beveling portion 106 may have a second beveling angle 120 of less than 20 degrees or greater than 30 degrees relative to the inner edge 88 of the deburring bit 66—dependent at least in part on the dimensions of the tube 26 to be deburred and beveled by the apparatus 20.

In at least one embodiment, the outer cutting portion 108 provides an outer chamfer 122 positioned adjacent to the beveling portion 106, the outer chamfer 122 configured for cooperating with the outer cutting portion 108 and the beveling portion 106 to remove any burrs from the outer surface 44 of the tube 26, proximal to the terminal end 24 of the tube 26, while also beveling an outer edge 123 of the terminal end 24 of the tube 26, during use of the apparatus 20. In at least one embodiment, the outer chamfer 122 is oriented so as to have a downwardly sloping outer chamfer angle 124 from the outer cutting portion 108 to the beveling portion 106. In at least one such embodiment, as illustrated in FIG. 4, the outer chamfer 122 has an outer chamfer angle 124 of about 1 degree to about 45 degrees relative to the outer cutting portion 108. However, in further embodiments, the outer chamfer 122 may have an outer chamfer angle 124 of less than 1 degree or greater than 45 degrees relative to the outer cutting portion 108—dependent at least in part on the dimensions of the tube 26 to be deburred and beveled by the apparatus 20.

In at least one embodiment, the inner cutting portion 104 provides an inner chamfer 126 positioned adjacent to the beveling portion 106, the inner chamfer 126 configured for cooperating with the inner cutting portion 104 and the beveling portion 106 to remove any burrs from the inner surface 110 of the tube 26, proximal to the terminal end 24 of the tube 26, while also beveling an inner edge 127 of the terminal end 24 of the tube 26, during use of the apparatus 20. In at least one embodiment, the inner chamfer 126 is oriented so as to have a downwardly sloping inner chamfer angle 128 from the inner cutting portion 104 to the beveling portion 106. In at least one such embodiment, as illustrated in FIG. 4, the inner chamfer 126 has an inner chamfer angle 128 of about 1 degree to about 45 degrees relative to the inner cutting portion 104. However, in further embodiments, the inner chamfer 126 may have an inner chamfer angle 128 of less than 1 degree or greater than 45 degrees relative to the inner cutting portion 104—dependent at least in part on the dimensions of the tube 26 to be deburred and beveled by the apparatus 20. Thus, in at least one embodiment, the cutting edge 102 of the deburring bit 66 is capable of deburring the terminal end 24 of the tube 26 (including the inner surface 110 and outer surface 44 of the tube 26 proximal to the terminal end 24) while also creating a bevel having a radius of up to 180 degrees.

As discussed above, in at least one embodiment, each of the bearings 36 and deburring bit 66 is capable of being selectively moved inwardly and outwardly relative to the center axis 38 of the deburring mechanism 22—thereby allowing the receiving diameter 48 to be selectively adjusted while also ensuring that the beveling portion 106 of the deburring bit 66 sits radially inwardly from and substantially adjacent to the receiving boundary 46—in order to accommodate a wide range of tubes 26 having varying outer diameters 50. In at least one embodiment, the bearings 36 and deburring bit 66 are configured for slidably moving within their respective bearing slot 52 and bit slot 68 in unison, thereby making it easier to manually adjust the deburring mechanism 22 for accommodating the outer diameter 50 of the tube 26 to be deburred and beveled by the apparatus 20. In at least one such embodiment, the deburring mechanism 22 provides an adjustment mechanism (not shown) configured for simultaneously adjusting the radial positions of each of the bearings 36. In at least one further such embodiment, the deburring mechanism 22 provides an adjustment mechanism (not shown) configured for simultaneously adjusting the radial positions of each of the bearings 36 as well as the deburring bit 66.

It should be noted that, in further embodiments, the deburring mechanism 22 (along with each of the deburring mechanism 22 components described herein—including but not limited to the bearings 36, bearing slots 52, bearing fasteners 58, deburring bit 66, bit slot 68, etc.) may take on any other sizes, shapes, dimensions, quantities, configurations and/or relative positions now known or later developed—dependent at least in part on the context in which the deburring mechanism 22 is to be used and/or the dimensions of the tube 26 to be deburred and beveled by the deburring mechanism 22—so long as the apparatus 20 is capable of substantially carrying out the functionality described herein. In at least one such further embodiment, the deburring bit 66 may provide additional instances of the cutting edge 102, with such additional instances of the cutting edge 102 being positioned elsewhere on the deburring end 72 of the deburring bit 66, or even on one or more of the outer edge 74, inner edge 88 and engagement end 70 of the deburring bit 66—thereby allowing the deburring bit 66 to be selectively rotated, relative to the bit slot 68, between uses of the deburring bit 66 so as to extend the life of the deburring bit 66. Accordingly, in at least one such further embodiment, one or more of the outer edge 74, inner edge 88 and deburring end 72 of the deburring bit 66 is also slidably positionable within the bit slot 68. In at least one such embodiment, each cutting edge 102 is identical in size, shape, dimensions and configuration as compared to the other cutting edges 102 of the deburring bit 66. In at least one alternate such embodiment, one or more of the cutting edge 102s of the deburring bit 66 is different in size, shape, dimensions and/or configuration as compared to the other cutting edges 102 of the deburring bit 66.

Figure 12:
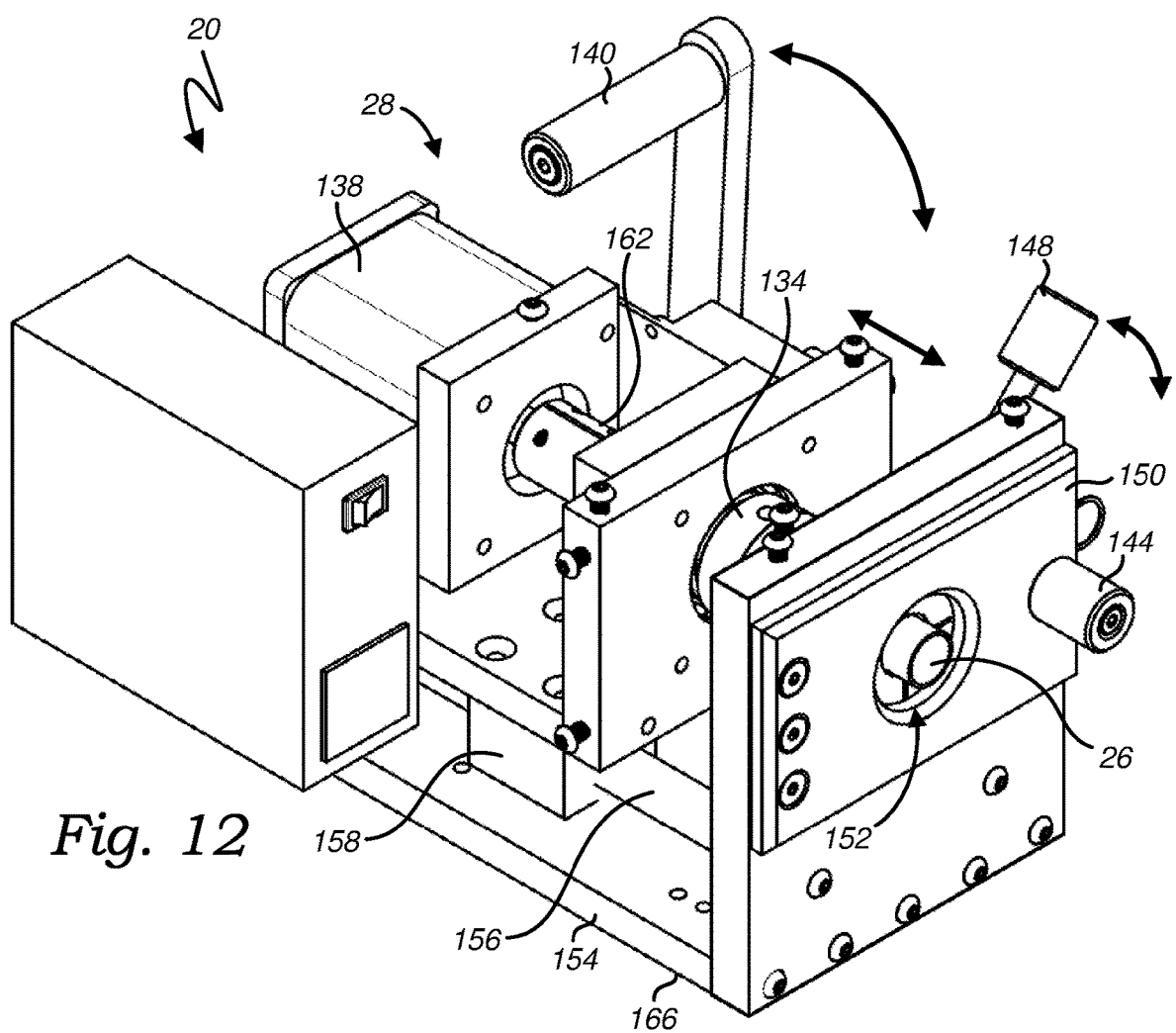
FIGS. 12-14 are perspective views of the apparatus, in accordance with at least one embodiment.
Figure 13:
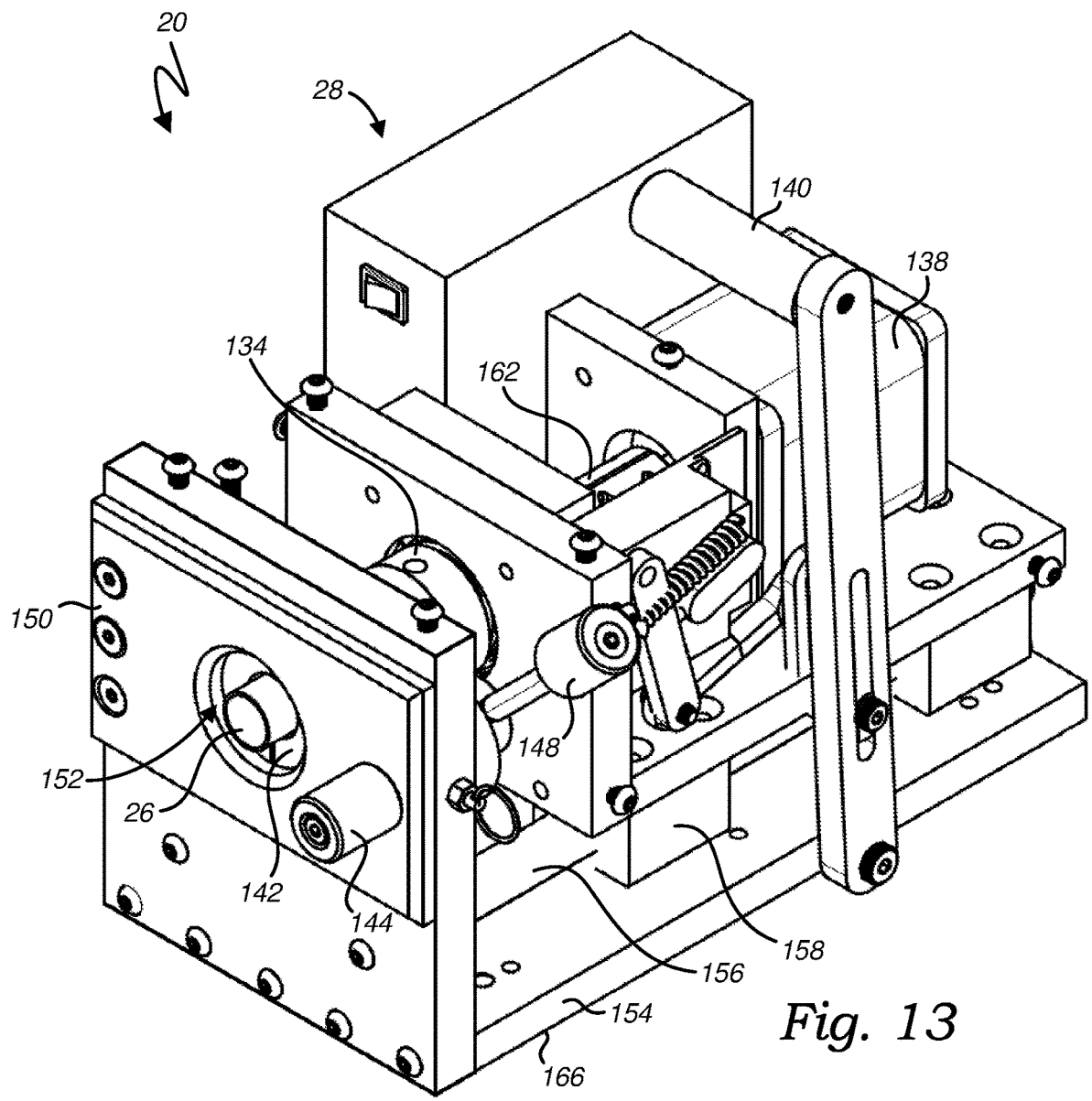
Figure 14:
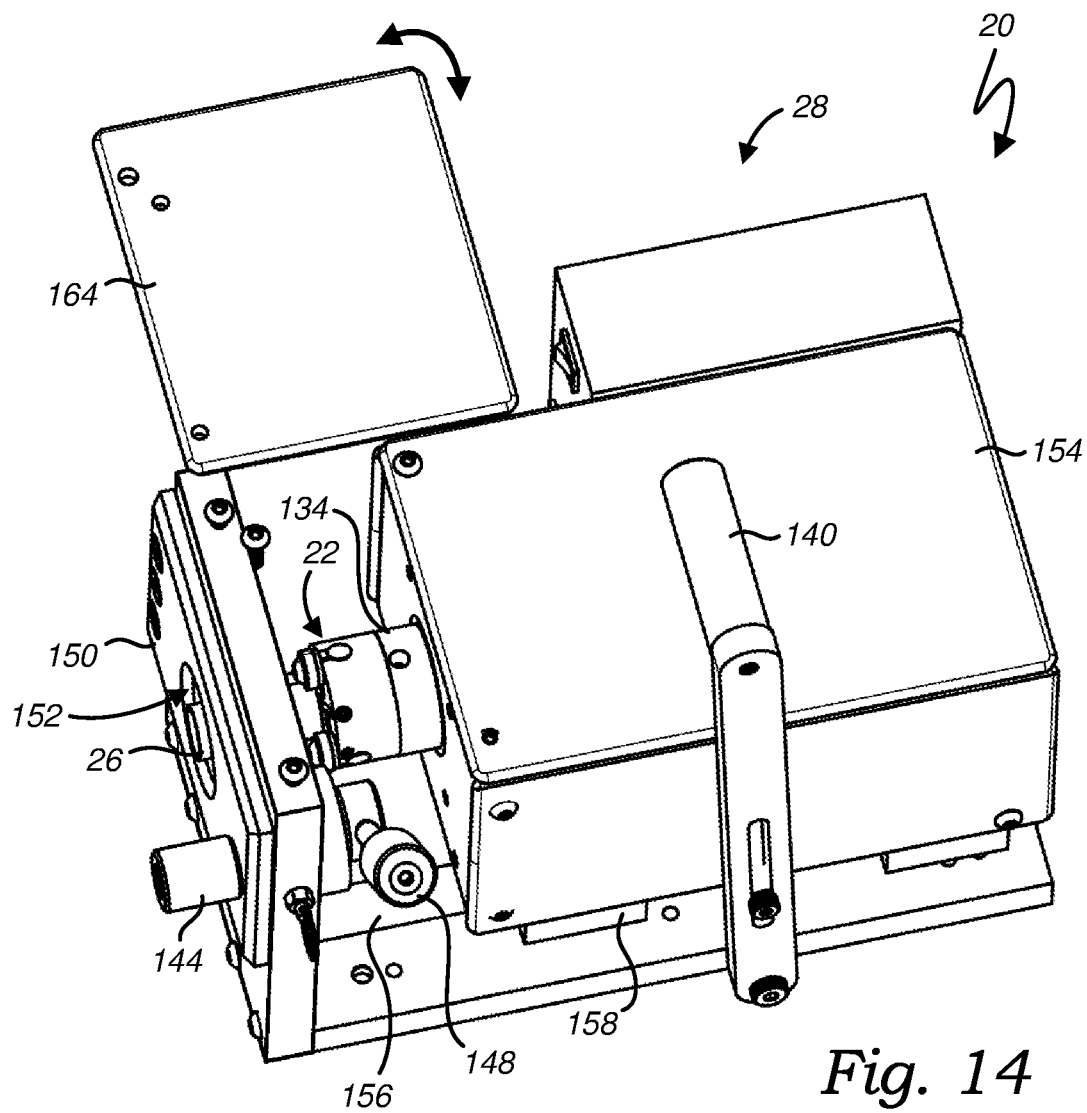

In at least one embodiment, as best illustrated in FIG. 1, the deburring mechanism 22 further provides an engagement portion 130 positioned on the second face 34 of the deburring body 30 and configured for being removably engaged with the torque mechanism 28 (FIGS. 12-14). In at least one embodiment, the engagement portion 130 is an elongate shaft 132 configured for being removably engaged with a bushing assembly 134 of the torque mechanism 28. In at least one embodiment, each of the shaft 132 and bushing assembly 134 is positioned substantially collinearly with the center axis 38 of the deburring mechanism 22. As discussed further below, in at least one such embodiment, the torque mechanism 28 is configured for selectively delivering a desired amount of torque to the bushing assembly 134 which, in turn, transmits the torque to the shaft 132 of the deburring mechanism 22. In at least one embodiment, the shaft 132 provides an at least one detent 136 positioned and configured for facilitating a relatively faster engagement and subsequent disengagement from the bushing assembly 134. In further embodiments, the engagement portion 130 may comprise any other mechanism or take on any other sizes, shapes, configurations and/or relative positions, now known or later developed, so long as the engagement portion 130 is capable of creating a removable engagement with the torque mechanism 28. In at least one still further embodiment, the engagement portion 130 is permanently engaged with the torque mechanism 28.

In at least one embodiment, with continued reference to FIGS. 12-14, the torque mechanism 28 provides a rotary motor 138 in mechanical communication with the bushing assembly 134 for selectively delivering the desired amount of torque to the bushing assembly 134 during use of the apparatus 20. In at least one embodiment, the motor 138 is a 1 horsepower variable speed direct drive motor 138 having a speed range of about 400 rpm to about 3,000 rpm; however, in further embodiments, the motor 138 may be any other type of motor 138, now known or later developed, capable of delivering the desired amount of torque to the bushing assembly 134. Additionally, in at least one embodiment, the motor 138 is capable of selectively rotating in each of a clockwise and counterclockwise direction.

In at least one embodiment, the torque mechanism 28 further provides an actuation lever 140 in mechanical communication with the motor 138 for selectively actuating the motor 138. In at least one embodiment, the actuation lever 140 is further configured for selectively adjusting the speed of the motor 138 as well. In at least one such embodiment, a user of the apparatus 20 may selectively set a minimum speed and a maximum speed for the motor 138, such that as the actuation lever 140 is rotated in a first rotational direction, the speed of the motor 138 increases; and as the actuation lever 140 is rotated in an opposing second rotational direction, the speed of the motor 138 decreases. Additionally, in at least one embodiment, the actuation lever 140 is capable of selectively rotating between one of a rest position—wherein the motor 138 is at rest—and a maximum position—wherein the motor 138 is rotating at the maximum speed. In at least one embodiment, the torque mechanism 28 further provides an automatic power brake configured for automatically engaging the motor 138 when the actuation lever 140 is in the rest position.

In at least one embodiment, the torque mechanism 28 also provides a tube clamp 142 configured for temporary frictional engagement with the outer surface 44 of the tube 26, proximal to the terminal end 24 of the tube 26, for securely maintaining a position of the terminal end 24 of the tube 26 relative to the deburring mechanism 22 during use of the apparatus 20. Accordingly, in at least one embodiment, the tube clamp 142 is positioned proximal to the deburring mechanism 22, such that the terminal end 24 of the tube 26 is spaced a distance apart from the deburring mechanism 22 when the tube 26 is engaged with the tube clamp 142 and the actuation lever 140 is in the rest position, the purpose for which is discussed further below.

In at least one embodiment, the tube clamp 142 is configured as an adjustable split die clamp. However, in further embodiments, the tube clamp 142 may be configured as any other type of clamp, now known or later developed, capable of securely maintaining the position of the terminal end 24 of the tube 26 relative to the deburring mechanism 22 during use of the apparatus 20. In at least one embodiment, the tube clamp 142 provides an adjustment mechanism 144 configured for selectively adjusting one or both of a diameter and a clamping force of the tube clamp 142, so as to better accommodate tubes 26 of varying outer diameter 50s. In at least one embodiment, where the tube clamp 142 is an adjustable split die clamp, the tube clamp 142 further provides tension adjustment screws 146 positioned and configured for enabling tension and clamping force adjustment in one or more of a horizontal direction, a vertical direction, and a diagonal direction (i.e., a direction between horizontal and vertical) relative to the orientation of the tube clamp 142, thereby better ensuring horizontal and vertical clamping stability while also allowing the tube clamp 142 to compensate for wear over time. In at least one embodiment, the tube clamp 142 further provides a clamp lever 148 configured for being manually rotated in order to selectively move the tube clamp 142 between one of an engaged position—wherein the tube clamp 142 is in frictional contact with the outer surface 44 of the tube 26—and a disengaged position—wherein the tube clamp 142 is not in contact with the outer surface 44 of the tube 26.

In at least one embodiment, the torque mechanism 28 further provides a guide plate 150 positioned substantially adjacent to the tube clamp 142. The guide plate 150 defines a guide aperture 152 sized for allowing the terminal end 24 of the tube 26 to extend therethrough prior to being engaged by the tube clamp 142. The guide aperture 152 is substantially collinearly aligned with the tube clamp 142, such that the guide aperture 152 ensures proper positioning of the tube 26 relative to the tube clamp 142. Additionally, the tube clamp 142 and guide aperture 152 are each positioned substantially collinearly with the center axis 38 of the deburring mechanism 22, such that the tube clamp 142, in turn, ensures proper positioning of the tube 26 relative to the deburring mechanism 22.

Figure 15:
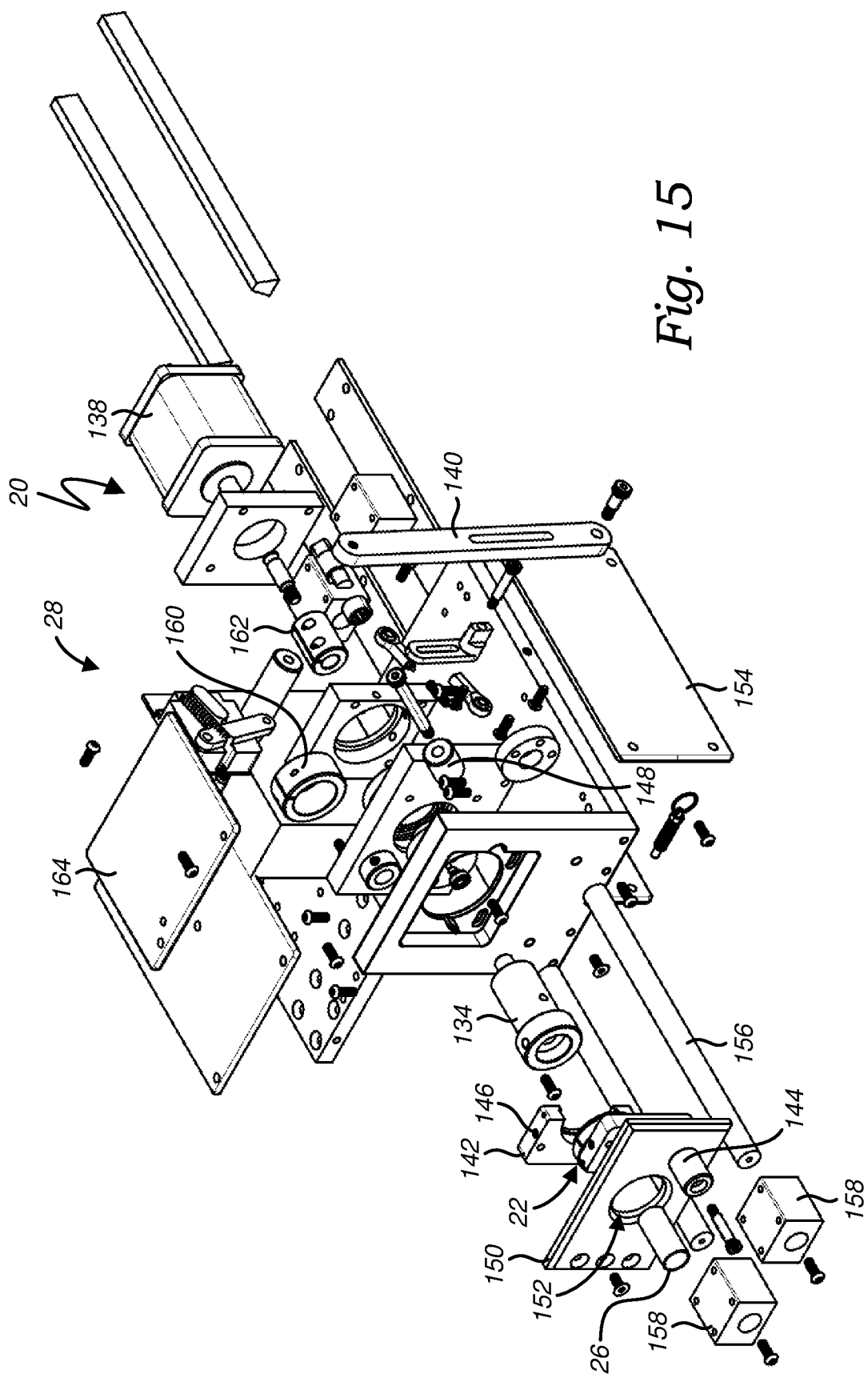
FIG. 15 is an exploded perspective view of the apparatus, in accordance with at least one embodiment.

In at least one embodiment, as best illustrated in FIG. 15, a housing 154 of the torque mechanism 28 provides an at least one longitudinally oriented guide rail 156 on which a torque carrier 158 is slidably positioned. In at least one such embodiment, the at least one guide rail 156 further provides a plurality of ball bearings over which the torque carrier 158 slidably travels. In at least one embodiment, the bushing assembly 134 is positioned on the torque carrier 158, thereby allowing the deburring mechanism 22 to travel along the guide rail 156 (when the deburring mechanism 22 is engaged with the bushing assembly 134). Accordingly, the deburring mechanism 22 is capable of selectively traveling between one of an extended position—wherein the deburring mechanism 22 is moved into contact with the terminal end 24 of the tube 26 (while the tube 26 is frictionally engaged within the tube clamp 142) such that the terminal end 24 of the tube 26 is coaxially positioned within the receiving boundary 46 between the bearings 36 and the cutting edge 102 of the deburring bit 66 is in contact with the terminal end 24 of the tube 26, as discussed in detail above—and a retracted position—wherein the deburring mechanism 22 is moved out of contact with the terminal end 24 of the tube 26. In at least one further embodiment, the motor 138 is also positioned on the torque carrier 158. In at least one embodiment, the actuation lever 140 is pivotally engaged with the housing 154 and also in mechanical communication with the torque carrier 158, such that the actuation lever 140 is capable of selectively moving the deburring mechanism 22 between the extended and retracted positions. Thus, in such embodiments, when the actuation lever 140 is rotated in the first rotational direction, the deburring mechanism 22 is moved into the extended position while the motor 138 simultaneously delivers the desired amount of torque to the deburring mechanism 22 via the bushing assembly 134; and when the actuation lever 140 is subsequently rotated in the second rotational direction, the rotational speed of the motor 138 decreases while the deburring mechanism 22 is simultaneously moved into the retracted position. In at least one embodiment, the actuation lever 140 is further configured for being used to manually lift and carry the apparatus 20 when the apparatus 20 is not in use.

In at least one embodiment, the bushing assembly 134 provides a pair of spindle bearings 160 configured as thrust bearings, while the bushing assembly 134 is mechanically linked with the motor 138 via a rigid coupling 162, thereby enabling the motor 138 to act as a rear stabilizing bearing so as to reduce any vibrational forces during use of the apparatus 20.

In at least one embodiment, as best illustrated in FIG. 14, the housing 154 of the torque mechanism 28 provides an at least one safety panel 164 positioned and configured for creating a protective barrier between the user and the deburring mechanism 22 during use of the apparatus 20. In at least one embodiment, the at least one safety panel 164 is constructed out of a transparent or semi-transparent material, such as acrylic for example, so as to not create any visual obstructions for the user during use of the apparatus 20. In at least one embodiment, the at least one safety panel 164 is pivotally engaged with the housing 154, thereby allowing the safety panel 164 to selectively pivot away from the housing 154 when the apparatus 20 is not in use, allowing the user access to the deburring mechanism 22 for any required maintenance or adjustments thereto.

In at least one embodiment, a bottom surface 166 of the housing 154 provides an at least one releasable magnet (not shown) positioned and configured for temporarily securing the torque mechanism 28 to a magnetic surface in order to stabilize the torque mechanism 28 during use of the apparatus 20—particularly when the tube 26 is relatively long and/or heavy as compared to the weight of the apparatus 20.

Accordingly, in at least one embodiment, the apparatus 20 provides a relatively lightweight (approximately 34 pounds in at least one embodiment), compact and portable solution for deburring and beveling the terminal end 24s of tubes 26 having a wide range of dimensions.

It should be noted that, in further embodiments, the torque mechanism 28 (along with each of the torque mechanism 28 components described herein—including but not limited to the housing 154, motor 138, bushing assembly 134, tube clamp 142, actuation lever 140, etc.) may take on any other sizes, shapes, dimensions, quantities, configurations and/or relative positions now known or later developed—dependent at least in part on the context in which the apparatus 20 is to be used and/or the dimensions of the tube 26 to be deburred and beveled by the deburring mechanism 22—so long as the apparatus 20 is capable of substantially carrying out the functionality described herein.

In at least one embodiment, during use of the apparatus 20 to deburr and bevel the terminal end 24 of a given tube 26, the bearings 36 and deburring bit 66 are adjusted to accommodate the dimensions of the terminal end 24 of the tube 26, and the deburring mechanism 22 is engaged with the bushing assembly 134 of the torque mechanism 28. The tube clamp 142 is also adjusted to accommodate the dimensions of the terminal end 24 of the tube 26. The minimum and maximum rotational speeds of the motor 138 are set to the desired speeds. The terminal end 24 of the tube 26 is inserted a distance through the guide aperture 152 and the clamp lever 148 is rotated into the engaged position to bring the tube clamp 142 into frictional contact with the outer surface 44 of the tube 26. The at least one safety panel 164 is moved into position. The actuation lever 140 is then rotated in the first rotational direction, thereby moving the deburring mechanism 22 into the extended position while the motor 138 simultaneously delivers the desired amount of torque to the deburring mechanism 22 which, in turn, deburs and bevels the terminal end 24 of the tube 26. Once the terminal end 24 of the tube 26 has been sufficiently deburred and beveled, the actuation lever 140 is subsequently rotated in the second rotational direction, thereby decelerating the motor 138 while simultaneously moving the deburring mechanism 22 into the retracted position. The clamp lever 148 is rotated into the disengaged position to move the tube clamp 142 out of frictional contact with the outer surface 44 of the tube 26, and the deburred and beveled tube 26 is then removed from the guide aperture 152.

Aspects of the present specification may also be described as the following embodiments:

1. A tube deburring apparatus for deburring and beveling a terminal end of a tube, the apparatus comprising: a deburring mechanism configured for use with a torque mechanism capable of selectively delivering a desired amount of torque to the deburring mechanism, the deburring mechanism comprising: a deburring body having a first face and an opposing second face; a plurality of bearings positioned substantially on the first face of the deburring body and radially arranged about a center axis of rotation of the deburring body, the bearings radially spaced apart from one another and cooperating to define an imaginary receiving boundary having a receiving diameter that is sized for approximating an outer diameter of the tube, thereby allowing the terminal end of the tube to be coaxially positioned within the receiving boundary, such that a circumferential bearing sidewall of each bearing is in rolling contact with a circumferential outer surface of the tube; the first face of the deburring body defining a radially oriented bearing slot for each of the bearings, each bearing slot providing a bearing carrier slidably positioned therewithin; each bearing rotatably mounted to the corresponding one of the bearing carriers, such that each bearing is capable of selectively moving inwardly and outwardly relative to the center axis via the corresponding bearing carrier, thereby allowing the receiving diameter of the receiving boundary to be selectively adjusted; a deburring bit positioned substantially on the first face of the deburring body in a position radially inwardly from the bearings and oriented substantially perpendicular to the first face of the deburring body, a deburring end of the deburring bit configured for selectively contacting the terminal end of the tube when the terminal end of the tube is coaxially positioned within the receiving boundary between the bearings; the first face of the deburring body defining a radially oriented bit slot configured for slidably receiving an opposing engagement end of the deburring bit therewithin, such that the deburring bit is capable of selectively moving inwardly and outwardly relative to the center axis; the deburring end of the deburring bit providing a cutting edge positioned proximal to an inner edge of the deburring bit, the cutting edge comprising: an inner cutting portion positioned adjacent to the inner edge of the deburring bit and configured for contacting an inner surface of the tube, proximal to the terminal end of the tube, and removing any burrs therefrom when the terminal end of the tube is coaxially positioned within the receiving boundary between the bearings; a beveling portion positioned adjacent to the inner cutting portion and configured for contacting the terminal end of the tube and removing any burrs therefrom, while also beveling the terminal end of the tube, when the terminal end of the tube is coaxially positioned within the receiving boundary between the bearings; and an outer cutting portion positioned adjacent to the beveling portion and configured for contacting the outer surface of the tube, proximal to the terminal end of the tube, and removing any burrs therefrom when the terminal end of the tube is coaxially positioned within the receiving boundary between the bearings; wherein the outer cutting portion sits substantially on the receiving boundary formed by the bearings, while the beveling portion is positioned so as to sit radially inwardly from and substantially adjacent to the receiving boundary; and an engagement portion positioned on the second face of the deburring body and configured for being removably engaged with the torque mechanism.

2. The tube deburring apparatus according to embodiment 1, wherein the deburring body has a substantially cylindrical shape.

3. The tube deburring apparatus according to embodiments 1-2, wherein the deburring mechanism provides three radially spaced apart bearings.

4. The tube deburring apparatus according to embodiments 1-3, wherein: each bearing provides a bearing aperture sized and configured for allowing a bearing fastener to coaxially extend therethrough, in a direction substantially perpendicular to the first face of the deburring body; and each corresponding bearing carrier provides a carrier aperture sized and configured for threadably receiving the bearing fastener therethrough, thereby interconnecting the bearing and corresponding bearing carrier.

5. The tube deburring apparatus according to embodiments 1-4, wherein a fastener head of each bearing fastener is configured for being selectively tightened against the corresponding bearing, thereby sandwiching the bearing between the fastener head and the first face of the deburring body which, in turn, frictionally maintains the corresponding bearing carrier in position within the corresponding bearing slot.

6. The tube deburring apparatus according to embodiments 1-5, wherein the deburring mechanism further comprises an at least one spacer positioned between each bearing and the first face of the deburring body.

7. The tube deburring apparatus according to embodiments 1-6, wherein each spacer provides a spacer aperture sized and configured for allowing the corresponding bearing fastener to coaxially extend therethrough, thereby interconnecting the corresponding bearing, spacer and bearing carrier.

8. The tube deburring apparatus according to embodiments 1-7, wherein the deburring bit is constructed out of a carbide material.

9. The tube deburring apparatus according to embodiments 1-8, wherein the deburring end of the deburring bit is removably engageable with the bit slot.

10. The tube deburring apparatus according to embodiments 1-9, wherein an outwardly oriented outer edge of the deburring bit is engaged with a bit adjuster positioned and configured for selectively moving the deburring bit inwardly and outwardly relative to the center axis via the bit slot.

11. The tube deburring apparatus according to embodiments 1-10, wherein the bit adjuster is a set screw threadably engaged with the bit slot and accessible through a sidewall of the deburring body, whereby rotating the set screw in a first direction causes the deburring bit to move inwardly within the bit slot, and rotating the set screw in an opposing second direction causes the deburring bit to move outwardly within the bit slot.

12. The tube deburring apparatus according to embodiments 1-11, wherein the deburring mechanism provides a bit lock positioned and configured for selectively preventing the deburring bit from moving inwardly and outwardly relative to the center axis via the bit slot.

13. The tube deburring apparatus according to embodiments 1-12, wherein the bit lock is a set screw threadably engaged with a locking slot that converges with the bit slot, thereby allowing the set screw to come into frictional abutting contact with the deburring bit so as to physically prevent the deburring bit from moving within the bit slot.

14. The tube deburring apparatus according to embodiments 1-13, wherein the deburring bit has a bit height of about 0.30 inches to about 0.50 inches.

15. The tube deburring apparatus according to embodiments 1-14, wherein the deburring bit has a bit width of about 0.30 inches to about 0.50 inches.

16. The tube deburring apparatus according to embodiments 1-15, wherein the deburring bit has a bit thickness of about 0.1 inches to about 0.2 inches.

17. The tube deburring apparatus according to embodiments 1-16, wherein the inner cutting portion is oriented so as to have a downwardly sloping inner cutting angle from a leading face of the deburring bit to an opposing trailing face of the deburring bit.

18. The tube deburring apparatus according to embodiments 1-17, wherein the inner cutting portion has an inner cutting angle of about 10 degrees to about 30 degrees relative to the leading face of the deburring bit.

19. The tube deburring apparatus according to embodiments 1-18, wherein the outer cutting portion is oriented so as to have a downwardly sloping outer cutting angle from a leading face of the deburring bit to an opposing trailing face of the deburring bit.

20. The tube deburring apparatus according to embodiments 1-19, wherein the outer cutting portion has an outer cutting angle of about 10 degrees to about 30 degrees relative to the leading face of the deburring bit.

21. The tube deburring apparatus according to embodiments 1-20, wherein the inner cutting angle is substantially equal to the outer cutting angle.

22. The tube deburring apparatus according to embodiments 1-21, wherein the inner cutting angle is less than the outer cutting angle.

23. The tube deburring apparatus according to embodiments 1-22, wherein the inner cutting angle is greater than the outer cutting angle.

24. The tube deburring apparatus according to embodiments 1-23, wherein the beveling portion is configured as a concave groove, having a substantially semi-circular shape in cross-section, extending from a leading face of the deburring bit to an opposing trailing face of the deburring bit.

25. The tube deburring apparatus according to embodiments 1-24, wherein the beveling portion has a beveling diameter of about 0.03 millimeters to about 3.1 millimeters.

26. The tube deburring apparatus according to embodiments 1-25, wherein the beveling portion is oriented so as to have a downwardly sloping first beveling angle from a leading face of the deburring bit to an opposing trailing face of the deburring bit.

27. The tube deburring apparatus according to embodiments 1-26, wherein the beveling portion has a first beveling angle of about 20 degrees to about 30 degrees relative to the leading face of the deburring bit.

28. The tube deburring apparatus according to embodiments 1-27, wherein the first beveling angle is substantially equal to one or both of the inner cutting angle and outer cutting angle.

29. The tube deburring apparatus according to embodiments 1-28, wherein the first beveling angle is less than one or both of the inner cutting angle and outer cutting angle.

30. The tube deburring apparatus according to embodiments 1-29, wherein the first beveling angle is greater than one or both of the inner cutting angle and outer cutting angle.

31. The tube deburring apparatus according to embodiments 1-30, wherein the beveling portion is further oriented so as to have an outwardly oriented second beveling angle from the leading face of the deburring bit to the trailing face of the deburring bit, relative to the inner edge of the deburring bit.

32. The tube deburring apparatus according to embodiments 1-31, wherein the beveling portion has a second beveling angle of about 20 degrees to about 30 degrees relative to the inner edge of the deburring bit.

33. The tube deburring apparatus according to embodiments 1-32, wherein the outer cutting portion provides an outer chamfer positioned adjacent to the beveling portion, the outer chamfer configured for cooperating with the outer cutting portion and the beveling portion to remove any burrs from the outer surface of the tube, proximal to the terminal end of the tube, while also beveling an outer edge of the terminal end of the tube.

34. The tube deburring apparatus according to embodiments 1-33, wherein the outer chamfer is oriented so as to have a downwardly sloping outer chamfer angle from the outer cutting portion to the beveling portion.

35. The tube deburring apparatus according to embodiments 1-34, wherein the outer chamfer has an outer chamfer angle of about 1 degree to about 45 degrees relative to the outer cutting portion.

36. The tube deburring apparatus according to embodiments 1-35, wherein the inner cutting portion provides an inner chamfer positioned adjacent to the beveling portion, the inner chamfer configured for cooperating with the inner cutting portion and the beveling portion to remove any burrs from the inner surface of the tube, proximal to the terminal end of the tube, while also beveling an inner edge of the terminal end of the tube.

37. The tube deburring apparatus according to embodiments 1-36, wherein the inner chamfer is oriented so as to have a downwardly sloping inner chamfer angle from the inner cutting portion to the beveling portion.

38. The tube deburring apparatus according to embodiments 1-37, wherein the inner chamfer has an inner chamfer angle of about 1 degree to about 45 degrees relative to the inner cutting portion.

39. The tube deburring apparatus according to embodiments 1-38, wherein the engagement portion is an elongate shaft configured for being removably engaged with a bushing assembly of the torque mechanism.

40. The tube deburring apparatus according to embodiments 1-39, wherein the shaft is positioned substantially colinearly with the center axis of the deburring body.

41. The tube deburring apparatus according to embodiments 1-40, wherein the shaft provides an at least one detent positioned and configured for facilitating a relatively faster engagement and subsequent disengagement from the bushing assembly of the torque mechanism.

42. The tube deburring apparatus according to embodiments 1-41, further comprising a torque mechanism comprising: a housing providing an at least one longitudinally oriented guide rail; a tube clamp positioned within the housing and configured for temporary frictional engagement with the outer surface of the tube, proximal to the terminal end of the tube, for securely maintaining a position of the terminal end of the tube relative to the deburring mechanism; a torque carrier slidably positioned on the at least one guide rail; a bushing assembly positioned on the torque carrier and configured for engagement with the engagement portion of the deburring mechanism, such that the deburring mechanism is capable of selectively moving along the at least one guide rail between one of an extended position—wherein the deburring mechanism is moved into contact with the terminal end of the tube, while the tube is frictionally engaged within the tube clamp, such that the terminal end of the tube is coaxially positioned within the receiving boundary between the bearings and the cutting edge of the deburring bit is in contact with the terminal end of the tube—and a retracted position—wherein the deburring mechanism is moved out of contact with the terminal end of the tube; a rotary motor positioned on the torque carrier and in mechanical communication with the bushing assembly for selectively delivering the desired amount of torque to the bushing assembly and, in turn, the deburring mechanism; and an actuation lever pivotally engaged with the housing and in mechanical communication with each of the motor and torque carrier, the actuation lever configured for being selectively rotated between one of a maximum position—wherein the actuation lever is rotated in a first rotational direction, causing the speed of the motor to progressively increase and moving the deburring mechanism into the extended position—and a rest position—wherein the actuation lever is rotated in an opposing second rotational direction, causing the speed of the motor to progressively decrease and moving the deburring mechanism into the retracted position.

43. The tube deburring apparatus according to embodiments 1-42, wherein the motor is a 1 horsepower variable speed direct drive motor having a speed range of about 400 rpm to about 3,000 rpm.

44. The tube deburring apparatus according to embodiments 1-43, wherein the torque mechanism further provides an automatic power brake configured for automatically engaging the motor when the actuation lever is in the rest position.

45. The tube deburring apparatus according to embodiments 1-44, wherein the tube clamp is an adjustable split die clamp.

46. The tube deburring apparatus according to embodiments 1-45, wherein the tube clamp provides an adjustment mechanism configured for selectively adjusting one or both of a diameter and a clamping force of the tube clamp.

47. The tube deburring apparatus according to embodiments 1-46, wherein the tube clamp provides tension adjustment screws positioned and configured for enabling tension and clamping force adjustment in one or more of a horizontal direction, a vertical direction, and a diagonal direction relative to the tube clamp.

48. The tube deburring apparatus according to embodiments 1-47, wherein the tube clamp further provides a clamp lever configured for being manually rotated in order to selectively move the tube clamp between one of an engaged position—wherein the tube clamp is in frictional contact with the outer surface of the tube—and a disengaged position—wherein the tube clamp is not in contact with the outer surface of the tube.

49. The tube deburring apparatus according to embodiments 1-48, wherein the torque mechanism further provides a guide plate positioned substantially adjacent to the tube clamp, the guide plate defining a guide aperture sized for allowing the terminal end of the tube to extend therethrough prior to being engaged by the tube clamp.

50. The tube deburring apparatus according to embodiments 1-49, wherein the guide aperture is substantially collinearly aligned with the tube clamp, such that the guide aperture ensures proper positioning of the tube relative to the tube clamp.

51. The tube deburring apparatus according to embodiments 1-50, wherein the tube clamp and guide aperture are each positioned substantially collinearly with the center axis of the deburring mechanism, such that the tube clamp, in turn, ensures proper positioning of the tube relative to the deburring mechanism.

52. The tube deburring apparatus according to embodiments 1-51, wherein the bushing assembly provides a pair of spindle bearings configured as thrust bearings, while the bushing assembly is mechanically linked with the motor via a rigid coupling, thereby enabling the motor to act as a rear stabilizing bearing so as to reduce any vibrational forces during use of the apparatus.

53. The tube deburring apparatus according to embodiments 1-52, wherein the torque mechanism further provides an at least one safety panel engaged with the housing and configured for creating a protective barrier between the user and the deburring mechanism during use of the apparatus.

54. The tube deburring apparatus according to embodiments 1-53, wherein the at least one safety panel is pivotally engaged with the housing, thereby allowing the safety panel to selectively pivot away from the housing when the apparatus is not in use.

55. A tube deburring apparatus for deburring and beveling a terminal end of a tube, the apparatus comprising: a deburring mechanism configured for use with a torque mechanism capable of selectively delivering a desired amount of torque to the deburring mechanism, the deburring mechanism comprising: a deburring body having a first face and an opposing second face; a plurality of bearings positioned substantially on the first face of the deburring body and radially arranged about a center axis of rotation of the deburring body, the bearings radially spaced apart from one another and cooperating to define an imaginary receiving boundary having a receiving diameter that is sized for approximating an outer diameter of the tube, thereby allowing the terminal end of the tube to be coaxially positioned within the receiving boundary, such that a circumferential bearing sidewall of each bearing is in rolling contact with a circumferential outer surface of the tube; the first face of the deburring body defining a radially oriented bearing slot for each of the bearings, each bearing slot providing a bearing carrier slidably positioned therewithin; each bearing rotatably mounted to the corresponding one of the bearing carriers, such that each bearing is capable of selectively moving inwardly and outwardly relative to the center axis via the corresponding bearing carrier, thereby allowing the receiving diameter of the receiving boundary to be selectively adjusted; a deburring bit positioned substantially on the first face of the deburring body in a position radially inwardly from the bearings and oriented substantially perpendicular to the first face of the deburring body, a deburring end of the deburring bit configured for selectively contacting the terminal end of the tube when the terminal end of the tube is coaxially positioned within the receiving boundary between the bearings; the first face of the deburring body defining a radially oriented bit slot configured for slidably receiving an opposing engagement end of the deburring bit therewithin, such that the deburring bit is capable of selectively moving inwardly and outwardly relative to the center axis; the deburring end of the deburring bit providing a cutting edge positioned proximal to an inner edge of the deburring bit, the cutting edge comprising: an inner cutting portion positioned adjacent to the inner edge of the deburring bit and configured for contacting an inner surface of the tube, proximal to the terminal end of the tube, and removing any burrs therefrom when the terminal end of the tube is coaxially positioned within the receiving boundary between the bearings, the inner cutting portion oriented so as to have a downwardly sloping inner cutting angle from a leading face of the deburring bit to an opposing trailing face of the deburring bit; a concave beveling portion positioned adjacent to the inner cutting portion and configured for contacting the terminal end of the tube and removing any burrs therefrom, while also beveling the terminal end of the tube, when the terminal end of the tube is coaxially positioned within the receiving boundary between the bearings, the beveling portion oriented so as to have a downwardly sloping first beveling angle from a leading face of the deburring bit to an opposing trailing face of the deburring bit, along with an outwardly oriented second beveling angle from the leading face of the deburring bit to the trailing face of the deburring bit, relative to the inner edge of the deburring bit; an outer cutting portion positioned adjacent to the beveling portion and configured for contacting the outer surface of the tube, proximal to the terminal end of the tube, and removing any burrs therefrom when the terminal end of the tube is coaxially positioned within the receiving boundary between the bearings, the outer cutting portion oriented so as to have a downwardly sloping outer cutting angle from the leading face of the deburring bit to the trailing face of the deburring bit; the outer cutting portion providing an outer chamfer positioned adjacent to the beveling portion, the outer chamfer configured for cooperating with the outer cutting portion and the beveling portion to remove any burrs from the outer surface of the tube, proximal to the terminal end of the tube, while also beveling an outer edge of the terminal end of the tube, the outer chamfer oriented so as to have a downwardly sloping outer chamfer angle from the outer cutting portion to the beveling portion; and the inner cutting portion providing an inner chamfer positioned adjacent to the beveling portion, the inner chamfer configured for cooperating with the inner cutting portion and the beveling portion to remove any burrs from the inner surface of the tube, proximal to the terminal end of the tube, while also beveling an inner edge of the terminal end of the tube, the inner chamfer oriented so as to have a downwardly sloping inner chamfer angle from the inner cutting portion to the beveling portion; wherein the outer cutting portion sits substantially on the receiving boundary formed by the bearings, while the beveling portion is positioned so as to sit radially inwardly from and substantially adjacent to the receiving boundary; and an engagement portion positioned on the second face of the deburring body and configured for being removably engaged with the torque mechanism.

56. A tube deburring apparatus for deburring and beveling a terminal end of a tube, the apparatus comprising: a deburring mechanism comprising: a deburring body having a first face and an opposing second face; a plurality of bearings positioned substantially on the first face of the deburring body and radially arranged about a center axis of rotation of the deburring body, the bearings radially spaced apart from one another and cooperating to define an imaginary receiving boundary having a receiving diameter that is sized for approximating an outer diameter of the tube, thereby allowing the terminal end of the tube to be coaxially positioned within the receiving boundary, such that a circumferential bearing sidewall of each bearing is in rolling contact with a circumferential outer surface of the tube; the first face of the deburring body defining a radially oriented bearing slot for each of the bearings, each bearing slot providing a bearing carrier slidably positioned therewithin; each bearing rotatably mounted to the corresponding one of the bearing carriers, such that each bearing is capable of selectively moving inwardly and outwardly relative to the center axis via the corresponding bearing carrier, thereby allowing the receiving diameter of the receiving boundary to be selectively adjusted; a deburring bit positioned substantially on the first face of the deburring body in a position radially inwardly from the bearings and oriented substantially perpendicular to the first face of the deburring body, a deburring end of the deburring bit configured for selectively contacting the terminal end of the tube when the terminal end of the tube is coaxially positioned within the receiving boundary between the bearings; the first face of the deburring body defining a radially oriented bit slot configured for slidably receiving an opposing engagement end of the deburring bit therewithin, such that the deburring bit is capable of selectively moving inwardly and outwardly relative to the center axis; and the deburring end of the deburring bit providing a cutting edge positioned proximal to an inner edge of the deburring bit, the cutting edge comprising: an inner cutting portion positioned adjacent to the inner edge of the deburring bit and configured for contacting an inner surface of the tube, proximal to the terminal end of the tube, and removing any burrs therefrom when the terminal end of the tube is coaxially positioned within the receiving boundary between the bearings; a beveling portion positioned adjacent to the inner cutting portion and configured for contacting the terminal end of the tube and removing any burrs therefrom, while also beveling the terminal end of the tube, when the terminal end of the tube is coaxially positioned within the receiving boundary between the bearings; and an outer cutting portion positioned adjacent to the beveling portion and configured for contacting the outer surface of the tube, proximal to the terminal end of the tube, and removing any burrs therefrom when the terminal end of the tube is coaxially positioned within the receiving boundary between the bearings; wherein the outer cutting portion sits substantially on the receiving boundary formed by the bearings, while the beveling portion is positioned so as to sit radially inwardly from and substantially adjacent to the receiving boundary; and a torque mechanism capable of selectively delivering a desired amount of torque to the deburring mechanism, the torque mechanism comprising: a housing providing an at least one longitudinally oriented guide rail; a tube clamp positioned within the housing and configured for temporary frictional engagement with the outer surface of the tube, proximal to the terminal end of the tube, for securely maintaining a position of the terminal end of the tube relative to the deburring mechanism; a torque carrier slidably positioned on the at least one guide rail; a bushing assembly positioned on the torque carrier and configured for engagement with an engagement portion of the deburring mechanism, such that the deburring mechanism is capable of selectively moving along the at least one guide rail between one of an extended position—wherein the deburring mechanism is moved into contact with the terminal end of the tube, while the tube is frictionally engaged within the tube clamp, such that the terminal end of the tube is coaxially positioned within the receiving boundary between the bearings and the cutting edge of the deburring bit is in contact with the terminal end of the tube—and a retracted position—wherein the deburring mechanism is moved out of contact with the terminal end of the tube; a rotary motor positioned on the torque carrier and in mechanical communication with the bushing assembly for selectively delivering the desired amount of torque to the bushing assembly and, in turn, the deburring mechanism; and an actuation lever pivotally engaged with the housing and in mechanical communication with each of the motor and torque carrier, the actuation lever configured for being selectively rotated between one of a maximum position—wherein the actuation lever is rotated in a first rotational direction, causing the speed of the motor to progressively increase and moving the deburring mechanism into the extended position—and a rest position—wherein the actuation lever is rotated in an opposing second rotational direction, causing the speed of the motor to progressively decrease and moving the deburring mechanism into the retracted position.

In closing, regarding the exemplary embodiments of the present invention as shown and described herein, it will be appreciated that a tube deburring apparatus and associated methods of use are disclosed for deburring and beveling a terminal end of a tube. Because the principles of the invention may be practiced in a number of configurations beyond those shown and described, it is to be understood that the invention is not in any way limited by the exemplary embodiments, but is generally directed to a tube deburring apparatus and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the terms "about" and "approximately." As used herein, the terms "about" and "approximately" mean that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein. Similarly, as used herein, unless indicated to the contrary, the term "substantially" is a term of degree intended to indicate an approximation of the characteristic, item, quantity, parameter, property, or term so qualified, encompassing a range that can be understood and construed by those of ordinary skill in the art, or at least encompassing a range of plus or minus ten percent above and below the value of the stated characteristic, item, quantity, parameter, property, or term.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.— for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

Any claims intended to be treated under 35 U.S.C. § 112(f) will begin with the words "means for," but use of the term "for" in any other context is not intended to invoke treatment under 35 U.S.C. § 112(f). Accordingly, Applicant reserves the right to pursue additional claims after filing this application, in either this application or in a continuing application.

It should be understood that any methods disclosed herein, along with the order in which the respective elements of any such method are performed, are purely exemplary. Depending on the implementation, they may be performed in any order or in parallel, unless indicated otherwise in the present disclosure.

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A tube deburring apparatus for deburring and beveling a terminal end of a tube, the apparatus comprising:
   a deburring mechanism configured for use with a torque mechanism capable of selectively delivering a desired amount of torque to the deburring mechanism, the deburring mechanism comprising:
   a deburring body having a first face and an opposing second face;
   a plurality of bearings positioned on the first face of the deburring body and radially arranged about a center axis of rotation of the deburring body, the bearings radially spaced apart from one another and cooperating to define an imaginary receiving boundary having a receiving diameter sized and configured for receiving the terminal end of the tube such that a central longitudinal axis of the tube is coaxially aligned with the center axis of rotation of the deburring body, wherein a circumferential bearing sidewall of each bearing is in rolling contact with a circumferential outer surface of the tube in order to position the terminal end of the tube relative to the deburring mechanism;
   the first face of the deburring body defining a separate radially oriented bearing slot for each of the bearings, each bearing slot providing a bearing carrier slidably positioned therewithin;

each bearing rotatably mounted to a corresponding one of the bearing carriers, such that each bearing is capable of selectively moving inwardly and outwardly relative to the center axis via the corresponding bearing carrier, thereby allowing the receiving diameter of the receiving boundary to be selectively adjusted;

a deburring bit positioned on the first face of the deburring body in a position radially inwardly from the bearings with a longitudinal axis of the deburring bit oriented perpendicular to the first face of the deburring body, a deburring end of the deburring bit configured for contacting the terminal end of the tube when the terminal end of the tube is positioned within the receiving boundary between the bearings;

the first face of the deburring body defining a radially oriented bit slot separate from the bearing slots;

an engagement end of the deburring bit directly engaged with a surface of the bit slot so as to selectively move inwardly and outwardly relative to the center axis;

the deburring end of the deburring bit providing a cutting edge positioned proximal to an inner edge of the deburring bit, the cutting edge comprising:
  an inner cutting portion positioned adjacent to the inner edge of the deburring bit and configured for contacting an inner surface of the tube, proximal to the terminal end of the tube, and removing any burrs therefrom when the terminal end of the tube is positioned within the receiving boundary between the bearings;
  a beveling portion positioned adjacent to the inner cutting portion and configured for contacting the terminal end of the tube and removing any burrs therefrom, while also beveling the terminal end of the tube, when the terminal end of the tube is positioned within the receiving boundary between the bearings; and
  an outer cutting portion positioned adjacent to the beveling portion and configured for contacting the outer surface of the tube, proximal to the terminal end of the tube, and removing any burrs therefrom when the terminal end of the tube is positioned within the receiving boundary between the bearings;
  wherein the outer cutting portion sits on the receiving boundary formed by the bearings, while the beveling portion is positioned so as to sit radially inwardly from and adjacent to the receiving boundary; and an engagement portion positioned on the second face of the deburring body and configured for being removably engaged with the torque mechanism.

2. The tube deburring apparatus of claim 1, wherein the inner cutting portion is oriented so as to have a downwardly sloping inner cutting angle from a leading face of the deburring bit to an opposing trailing face of the deburring bit.

3. The tube deburring apparatus of claim 2, wherein the inner cutting portion has an inner cutting angle of about 10 degrees to about 30 degrees relative to the leading face of the deburring bit.

4. The tube deburring apparatus of claim 1, wherein the outer cutting portion is oriented so as to have a downwardly sloping outer cutting angle from a leading face of the deburring bit to an opposing trailing face of the deburring bit.

5. The tube deburring apparatus of claim 4, wherein the outer cutting portion has an outer cutting angle of about 10 degrees to about 30 degrees relative to the leading face of the deburring bit.

6. The tube deburring apparatus of claim 1, wherein the beveling portion is configured as a concave groove, having a substantially semi-circular shape in cross-section, extending from a leading face of the deburring bit to an opposing trailing face of the deburring bit.

7. The tube deburring apparatus of claim 6, wherein the beveling portion has a beveling diameter of about 0.03 millimeters to about 3.1 millimeters.

8. The tube deburring apparatus of claim 1, wherein the beveling portion is oriented so as to have a downwardly sloping first beveling angle from a leading face of the deburring bit to an opposing trailing face of the deburring bit.

9. The tube deburring apparatus of claim 8, wherein the beveling portion has a first beveling angle of about 20 degrees to about 30 degrees relative to the leading face of the deburring bit.

10. The tube deburring apparatus of claim 8, wherein the beveling portion is further oriented so as to have an outwardly oriented second beveling angle from the leading face of the deburring bit to the trailing face of the deburring bit, relative to the inner edge of the deburring bit.

11. The tube deburring apparatus of claim 10, wherein the beveling portion has a second beveling angle of about 20 degrees to about 30 degrees relative to the inner edge of the deburring bit.

12. The tube deburring apparatus of claim 1, wherein the outer cutting portion provides an outer chamfer positioned adjacent to the beveling portion, the outer chamfer configured for cooperating with the outer cutting portion and the beveling portion to remove any burrs from the outer surface of the tube, proximal to the terminal end of the tube, while also beveling an outer edge of the terminal end of the tube.

13. The tube deburring apparatus of claim 12, wherein the outer chamfer is oriented so as to have a downwardly sloping outer chamfer angle from the outer cutting portion to the beveling portion.

14. The tube deburring apparatus of claim 13, wherein the outer chamfer has an outer chamfer angle of about 1 degree to about 45 degrees relative to the outer cutting portion.

15. The tube deburring apparatus of claim 1, wherein the inner cutting portion provides an inner chamfer positioned adjacent to the beveling portion, the inner chamfer configured for cooperating with the inner cutting portion and the beveling portion to remove any burrs from the inner surface of the tube, proximal to the terminal end of the tube, while also beveling an inner edge of the terminal end of the tube.

16. The tube deburring apparatus of claim 15, wherein the inner chamfer is oriented so as to have a downwardly sloping inner chamfer angle from the inner cutting portion to the beveling portion.

17. The tube deburring apparatus of claim 16, wherein the inner chamfer has an inner chamfer angle of about 1 degree to about 45 degrees relative to the inner cutting portion.

18. The tube deburring apparatus of claim 1, further comprising a torque mechanism comprising:
  a housing providing an at least one longitudinally oriented guide rail;
  a tube clamp positioned within the housing and configured for frictional engagement with the outer surface of the tube, proximal to the terminal end of the tube, for securely maintaining a position of the terminal end of the tube relative to the deburring mechanism;
a torque carrier slidably positioned on the at least one guide rail;
a bushing assembly positioned on the torque carrier and configured for engagement with the engagement portion of the deburring mechanism, such that the deburring mechanism is capable of selectively moving along the at least one guide rail between one of an extended position—wherein the deburring mechanism is moved into contact with the terminal end of the tube, while the tube is frictionally engaged within the tube clamp, such that the terminal end of the tube is positioned within the receiving boundary between the bearings and the cutting edge of the deburring bit is in contact with the terminal end of the tube—and a retracted position—wherein the deburring mechanism is moved out of contact with the terminal end of the tube;
a rotary motor positioned on the torque carrier and in mechanical communication with the bushing assembly for selectively delivering the desired amount of torque to the bushing assembly and, in turn, the deburring mechanism; and
an actuation lever pivotally engaged with the housing and in mechanical communication with each of the motor and torque carrier, the actuation lever configured for being selectively rotated between one of a maximum position—wherein the actuation lever is rotated in a first rotational direction, causing the speed of the motor to progressively increase and moving the deburring mechanism into the extended position—and a rest position—wherein the actuation lever is rotated in an opposing second rotational direction, causing the speed of the motor to progressively decrease and moving the deburring mechanism into the retracted position.

19. A tube deburring apparatus for deburring and beveling a terminal end of a tube, the apparatus comprising:
a deburring mechanism configured for use with a torque mechanism capable of selectively delivering a desired amount of torque to the deburring mechanism, the deburring mechanism comprising:
a deburring body having a first face and an opposing second face;
a plurality of bearings positioned on the first face of the deburring body and radially arranged about a center axis of rotation of the deburring body, the bearings radially spaced apart from one another and cooperating to define an imaginary receiving boundary having a receiving diameter sized and configured for receiving the terminal end of the tube such that a central longitudinal axis of the tube is coaxially aligned with the center axis of rotation of the deburring body, wherein a circumferential bearing sidewall of each bearing is in rolling contact with a circumferential outer surface of the tube in order to position the terminal end of the tube relative to the deburring mechanism;
the first face of the deburring body defining a separate radially oriented bearing slot for each of the bearings, each bearing slot providing a bearing carrier slidably positioned therewithin;
each bearing rotatably mounted to a corresponding one of the bearing carriers, such that each bearing is capable of selectively moving inwardly and outwardly relative to the center axis via the corresponding bearing carrier, thereby allowing the receiving diameter of the receiving boundary to be selectively adjusted;
a deburring bit positioned on the first face of the deburring body in a position radially inwardly from the bearings with a longitudinal axis of the deburring bit oriented perpendicular to the first face of the deburring body, a deburring end of the deburring bit configured for contacting the terminal end of the tube when the terminal end of the tube is positioned within the receiving boundary between the bearings;
the first face of the deburring body defining a radially oriented bit slot separate from the bearing slots;
an engagement end of the deburring bit directly engaged with a surface of the bit slot so as to selectively move inwardly and outwardly relative to the center axis;
the deburring end of the deburring bit providing a cutting edge positioned proximal to an inner edge of the deburring bit, the cutting edge comprising:
an inner cutting portion positioned adjacent to the inner edge of the deburring bit and configured for contacting an inner surface of the tube, proximal to the terminal end of the tube, and removing any burrs therefrom when the terminal end of the tube is positioned within the receiving boundary between the bearings, the inner cutting portion oriented so as to have a downwardly sloping inner cutting angle from a leading face of the deburring bit to an opposing trailing face of the deburring bit;
a concave beveling portion positioned adjacent to the inner cutting portion and configured for contacting the terminal end of the tube and removing any burrs therefrom, while also beveling the terminal end of the tube, when the terminal end of the tube is positioned within the receiving boundary between the bearings, the beveling portion oriented so as to have a downwardly sloping first beveling angle from a leading face of the deburring bit to an opposing trailing face of the deburring bit, along with an outwardly oriented second beveling angle from the leading face of the deburring bit to the trailing face of the deburring bit, relative to the inner edge of the deburring bit;
an outer cutting portion positioned adjacent to the beveling portion and configured for contacting the outer surface of the tube, proximal to the terminal end of the tube, and removing any burrs therefrom when the terminal end of the tube is positioned within the receiving boundary between the bearings, the outer cutting portion oriented so as to have a downwardly sloping outer cutting angle from the leading face of the deburring bit to the trailing face of the deburring bit;
the outer cutting portion providing an outer chamfer positioned adjacent to the beveling portion, the outer chamfer configured for cooperating with the outer cutting portion and the beveling portion to remove any burrs from the outer surface of the tube, proximal to the terminal end of the tube, while also beveling an outer edge of the terminal end of the tube, the outer chamfer oriented so as to have a downwardly sloping outer chamfer angle from the outer cutting portion to the beveling portion; and the inner cutting portion providing an inner chamfer positioned adjacent to the beveling portion, the inner chamfer configured for cooperating with the inner cutting portion and the beveling portion to remove any burrs from the inner surface of the tube, proximal to the terminal end of the tube, while also beveling an inner edge of the terminal end of the tube, the inner chamfer oriented so as to have a downwardly sloping inner chamfer angle from the inner cutting portion to the beveling portion;

wherein the outer cutting portion sits on the receiving boundary formed by the bearings, while the beveling portion is positioned so as to sit radially inwardly from and adjacent to the receiving boundary; and an engagement portion positioned on the second face of the deburring body and configured for being removably engaged with the torque mechanism.

20. A tube deburring apparatus for deburring and beveling a terminal end of a tube, the apparatus comprising:

a deburring mechanism comprising:

a deburring body having a first face and an opposing second face;

a plurality of bearings positioned on the first face of the deburring body and radially arranged about a center axis of rotation of the deburring body, the bearings radially spaced apart from one another and cooperating to define an imaginary receiving boundary having a receiving diameter sized and configured for receiving the terminal end of the tube such that a central longitudinal axis of the tube is coaxially aligned with the center axis of rotation of the deburring body, wherein a circumferential bearing sidewall of each bearing is in rolling contact with a circumferential outer surface of the tube in order to position the terminal end of the tube relative to the deburring mechanism;

the first face of the deburring body defining a separate radially oriented bearing slot for each of the bearings, each bearing slot providing a bearing carrier slidably positioned therewithin;

each bearing rotatably mounted to a corresponding one of the bearing carriers, such that each bearing is capable of selectively moving inwardly and outwardly relative to the center axis via the corresponding bearing carrier, thereby allowing the receiving diameter of the receiving boundary to be selectively adjusted;

a deburring bit positioned on the first face of the deburring body in a position radially inwardly from the bearings with a longitudinal axis of the deburring bit oriented perpendicular to the first face of the deburring body, a deburring end of the deburring bit configured for contacting the terminal end of the tube when the terminal end of the tube is positioned within the receiving boundary between the bearings;

the first face of the deburring body defining a radially oriented bit slot separate from the bearing slots;

an engagement end of the deburring bit directly engaged with a surface of the bit slot so as to selectively move inwardly and outwardly relative to the center axis; and the deburring end of the deburring bit providing a cutting edge positioned proximal to an inner edge of the deburring bit, the cutting edge comprising:

an inner cutting portion positioned adjacent to the inner edge of the deburring bit and configured for contacting an inner surface of the tube, proximal to the terminal end of the tube, and removing any burrs therefrom when the terminal end of the tube is positioned within the receiving boundary between the bearings;

a beveling portion positioned adjacent to the inner cutting portion and configured for contacting the terminal end of the tube and removing any burrs therefrom, while also beveling the terminal end of the tube, when the terminal end of the tube is positioned within the receiving boundary between the bearings; and an outer cutting portion positioned adjacent to the beveling portion and configured for contacting the outer surface of the tube, proximal to the terminal end of the tube, and removing any burrs therefrom when the terminal end of the tube is positioned within the receiving boundary between the bearings;

wherein the outer cutting portion sits on the receiving boundary formed by the bearings, while the beveling portion is positioned so as to sit radially inwardly from and adjacent to the receiving boundary; and a torque mechanism capable of selectively delivering a desired amount of torque to the deburring mechanism, the torque mechanism comprising:

providing an at least one longitudinally oriented guide rail;

a tube clamp configured for frictional engagement with the outer surface of the tube, proximal to the terminal end of the tube, for securely maintaining a position of the terminal end of the tube relative to the deburring mechanism;

a torque carrier slidably positioned on the at least one guide rail;

a bushing assembly positioned on the torque carrier and configured for engagement with an engagement portion of the deburring mechanism, such that the deburring mechanism is capable of selectively moving along the at least one guide rail between one of an extended position—wherein the deburring mechanism is moved into contact with the terminal end of the tube, while the tube is frictionally engaged within the tube clamp, such that the terminal end of the tube is positioned within the receiving boundary between the bearings and the cutting edge of the deburring bit is in contact with the terminal end of the tube—and a retracted position—wherein the deburring mechanism is moved out of contact with the terminal end of the tube;

a rotary motor positioned on the torque carrier and in mechanical communication with the bushing assembly for selectively delivering the desired amount of torque to the bushing assembly and, in turn, the deburring mechanism; and a pivoting actuation level in mechanical communication with each of the motor and torque carrier, the actuation lever configured for being selectively rotated between one of a maximum position—wherein the actuation lever is rotated in a first rotational direction, causing the speed of the motor to progressively increase and moving the deburring mechanism into the extended position—and a rest position—wherein the actuation lever is rotated in an opposing second rotational direction, causing the speed of the motor to progressively decrease and moving the deburring mechanism into the retracted position.

* * * * *